United States Patent
Kim et al.

(10) Patent No.: US 7,333,546 B2
(45) Date of Patent: Feb. 19, 2008

(54) CODING APPARATUS AND METHOD IN A CDMA MOBILE COMMUNICATION SYSTEM

(75) Inventors: Jae-Yoel Kim, Kunpo-shi (KR); Sung-Oh Hwang, Yongin-shi (KR); Hyun-Woo Lee, Suwon-shi (KR)

(73) Assignee: Samsung Electronics Co., Ltd. (KR)

( * ) Notice: Subject to any disclaimer, the term of this patent is extended or adjusted under 35 U.S.C. 154(b) by 1062 days.

(21) Appl. No.: 10/301,413

(22) Filed: Nov. 21, 2002

(65) Prior Publication Data

US 2003/0095532 A1 May 22, 2003

(30) Foreign Application Priority Data

Nov. 21, 2001 (KR) ............... 10-2001-0072799

(51) Int. Cl.
*H04B 14/04* (2006.01)

(52) U.S. Cl. ................................... 375/242

(58) Field of Classification Search ............... 375/242, 375/253, 254, 295, 296, 377; 714/790, 786, 714/724, 699
See application file for complete search history.

(56) References Cited

OTHER PUBLICATIONS

F.J. MacWilliams et al., The Theory of Error-Correcting Codes, Chapter 1, pp. 6-15.

*Primary Examiner*—Pankaj Kumar
(74) *Attorney, Agent, or Firm*—The Farrell Law Firm, PC

(57) ABSTRACT

In a mobile communication system, a coding apparatus receives 5 information bits and generates a code symbol stream comprised of 20 coded symbols. The coding apparatus generates 5 coded symbol streams having a length 32 by encoding the 5 individual information bits with different Walsh codes having a length 32, and generates a coded symbol stream comprised of 32 coded symbols by XORing the 5 coded symbol streams in a symbol unit. Further, the coding apparatus generates a code symbol stream comprised of 20 coded symbols by puncturing $2^{nd}$, $4^{th}$, $5^{th}$, $6^{th}$, $8^{th}$, $9^{th}$, $10^{th}$, $11^{th}$, $12^{th}$, $13^{th}$, $14^{th}$, and $30^{th}$ coded symbols among the 32 coded symbols.

22 Claims, 14 Drawing Sheets

CODING APPARATUS AND METHOD IN A CDMA MOBILE COMMUNICATION SYSTEM

PRIORITY

This application claims priority to an application entitled "Coding Apparatus and Method in a CDMA Mobile Communication System" filed in the Korean Industrial Property Office on Nov. 21, 2001 and assigned Ser. No. 2001-72799, the contents of which are herein incorporated by reference.

BACKGROUND OF THE INVENTION

1. Field of the Invention

The present invention relates generally to a coding apparatus and method in a CDMA (Code Division Multiple Access) mobile communication system, and in particular, to an apparatus and method for coding a high speed downlink shared channel.

2. Description of the Related Art

In general, HSDPA (High Speed Downlink Packet Access) refers to a technique for transmitting data using HS-DSCH (High Speed-Downlink Shared Channel), a downlink data channel for supporting high-speed downlink packet transmission, and its associated control channels in a $3^{rd}$ generation asynchronous mobile communication system. AMC (Adaptive Modulation and Coding), HARQ (Hybrid Automatic Retransmission Request), and FCS (Fast Cell Selection) techniques have been proposed in order to support the HSDPA. The AMC, HARQ and FCS techniques will be described herein below.

First, the AMC will be described. The AMC is one of the data transmission techniques for adaptively determining a modulation technique and a coding technique of a data channel according to a channel condition between a specific Node B and a UE (User Equipment), thus to increase the overall utilization efficiency of the Node B. Therefore, the AMC supports a plurality of modulation techniques and coding techniques, and modulates and codes a data channel signal by combining the modulation techniques and the coding techniques. Commonly, each combination of the modulation techniques and the coding techniques is called "MCS (Modulation and Coding Scheme)," and there are defined a plurality of MCS levels of #1 to #n according to the number of the MCSs. That is, the AMC adaptively determines an MCS level according to a channel condition between a UE and a Node B, thereby increasing the entire utilization efficiency of the Node B.

Next, the HARQ will be described, especially n-channel SAW HARQ (Stop and Wait Hybrid Automatic Retransmission Request). In the existing ARQ (Automatic Retransmission Request), an acknowledgement signal ACK and a retransmission packet are exchanged between a UE and a radio network controller (RNC) based on signaling from an upper layer. However, in the HSDPA, a part of the conventional MAC (Medium Access Control) functions in the RNC is transferred to a Node B, so that the ACK and a retransmission packet can be exchanged between a number of ("n") UEs and MAC HS-DSCH of the Node B over a physical channel. The part of the MAC functions, transmitted to the Node B, is referred to as MAC-HSDSCH. In addition, n logical channels are formed to transmit several packets before ACK is received. The general ARQ does not transmit the next packet data or retransmit previously transmitted packet data until it receives ACK or NACK for the previously transmitted packet data. Therefore, in some cases, the ARQ must await ACK, although it can currently transmit the next packet data. However, in the n-channel SAW HARQ, the next packet data is continuously transmitted before ACK for the previous packet data is received, thereby increasing utilization efficiency of channels. That is, if n logical channels are established between a UE and a Node B, and the n logical channels can be identified by time and unique channel numbers, then the UE can recognize a channel over which packet data was received, and rearrange the received packets in the correct reception order, or soft-combine the received packets.

Finally, the FCS will be described. In the FCS, if a UE supporting the HSDPA (hereinafter referred to as "HSDPA UE") enters a soft handover region, the HSDPA UE selects a Node B (or cell) having the best channel condition, and receives packets only from the selected Node B, thereby reducing the overall interference.

In order to apply the techniques applied to the HSDPA, the following control information is exchanged between a UE and a Node B (or cell). Since HS-DSCH fundamentally uses a multi-code transmission technique for high-speed transmission, information that must be transmitted from a Node B to a UE includes decoding-related information such as (i) channelization codes over which the HS-DSCH is transmitted, (ii) an MCS level used for the HS-DSCH and (iii) a code unit needed to analyze the HS-DSCH received, and information on the packets over which the HS-DSCH is transmitted. The information on the packets over which the HS-DSCH is transmitted may include HARQ information indicating a channel number, a packet number, and initial transmission or retransmission. Further, information that must be transmitted from a UE to a Node B includes ACK or NACK information for received packets, and information on a channel condition between the UE and the Node B to support the AMC and the FCS. In the FCS, if a cell having the best channel condition is changed, the UE transmits the corresponding information to the Node B so that a selected best cell can correctly transmit HS-DSCH to the UE.

FIG. 1 illustrates a method of transmitting downlink control information, downlink data, uplink control information and uplink data for the HSDPA. Referring to FIG. 1, a cell #1 101 is a cell providing an HSDPA service to a UE 111. Channels transmitted from the cell #1 101 to the UE 111 include (i) a high speed physical downlink shared channel (HS-PDSCH) for high-speed packet transmission, (ii) a downlink dedicated physical channel (DL_DPCH) for transmitting upper layer signaling, voice signal, and packet data and physical control information, which do not use HS-DSCH, and (iii) a shared control channel (SHCCH) for transmitting information required for analyzing the HS-PDSCH. Channels transmitted from the UE 111 to the cell #1 101 include an uplink dedicated physical channel (UL_DPCH) for transmitting upper layer signaling, voice signal, packet data and physical control information, and a secondary uplink dedicated physical control channel (S-UL_DPCCH) for transmitting control information for the HSDPA.

Structures of the uplink and downlink channels of FIG. 1 are illustrated in FIGS. 2A to 2C and 3A and 3B.

FIGS. 2A to 2C illustrate structures of downlink channels transmitted to an HSDPA UE, and FIGS. 3A and 3B illustrate structures of uplink channels transmitted by an HSDPA UE.

Specifically, FIG. 2A illustrates a structure of a high speed physical downlink shared channel (HS-PDSCH) transmitted from the cell #1 101 to the UE 111 in FIG. 1. The HS-PDSCH is transmitted at periods of 3 time slots 201 each having a length of 0.67 ms, and a data rate of the HS-PDSCH is determined based on an MCS level and the number of channelization codes in use. The channelization codes are used to distinguish between uplink and downlink channels in an asynchronous mobile communication system, and their length is defined as 4 to 512. The length of the channelization codes relates to a spreading factor (SF) of data.

FIG. 2B illustrates a structure of a downlink physical dedicated channel (DL_DPCH) transmitted from the cell #1 101 to the UE 111 in FIG. 1. The DL_DPCH is comprised of a downlink dedicated physical data channel (DL_DPDCH) and a downlink dedicated physical control channel (DL_DPCCH). In FIG. 2B, a first data part 212 and a second data part 215 are used to transmit upper layer signaling, voice data, and user data such as packet data which is not transmitted over the HS-PDSCH. A TPC (Transmit Power Control command) field 213 is used to transmit a power control command for controlling transmission power of an uplink channel transmitted from a UE to a cell. A TFCI field 214, a field for transmitting TFCI (Transmitted Format Combination Indicator), is used to transmit a data rate of the first data part 212 and the second data part 215, a channel configuration type, and channel decoding information. A Pilot field 216 is used by a UE to estimate a condition of a downlink channel transmitted from a cell to the UE. The first data part 212 to the Pilot field 216 constitute one time slot having a 2,560-chip length, and 15 such time slots constitute one radio frame having a 10 ms length. The radio frame is a basic physical transmission unit used in 3GPP ($3^{rd}$ Generation Partnership Project), a standard for an asynchronous mobile communication system.

FIG. 2C illustrates a structure of a shared control channel (SHCCH) transmitted from the cell #1 101 to the UE 111 in FIG. 1. The SHCCH, a channel for transmitting control information needed to receive HS-DSCH transmitted from the cell #1 101 to the UE 111, is a shared channel which is alternately received by UEs in a corresponding Node B (or cell) supporting an HSDPA service. The SHCCH can transmit control information required for receiving HS-DSCH, to one UE or a plurality of UEs at a certain point of time. In FIG. 2C, SHCCH 221, comprised of 3 time slots, transmits TFRI (Transmitted Format Resource Indicator) 223 and HARQ information 225 for a period of the 3 time slots. The TFRI 223 includes an MCS level used in the HS-DSCH, the number and type of channelization codes, and information required for decoding the HS-DSCH. The HARQ information 225 indicates a channel number transmitted in an n-channel SAW HARQ system supporting the HSDPA, and further indicates whether a packet to be transmitted over HS-PDSCH is an initial transmission packet or a retransmission packet retransmitted due to an error. The SHCCH is transmitted from a cell providing an HSDPA service to only a UE receiving the HSDPA service.

FIGS. 3A and 3B illustrate uplink channels transmitted from a UE to a cell in reply to the downlink channels illustrated in FIGS. 2A to 2C. Specifically, FIG. 3A illustrates an uplink dedicated physical channel (UL_DPCH) 311, which is comprised of an uplink dedicated physical data channel (UL_DPDCH) and an uplink dedicated physical control channel (UL_DPCCH). The UL_DPDCH is used to transmit uplink control information or user information from a UE to a cell or cells, and the UL_DPCCH is used to transmit physical control information from the UE to the cell. The UL_DPCCH is basically identical to the DL_DPCCH in function of individual fields. The UL_DPCCH and UL_DPDCH are channel-coded with different channelzation codes, and transmitted over I and Q channels of QPSK (Quadrature Phase Shift Keying), respectively. A basic transmission unit of the UL_DPCH is 10 ms radio frame, and the 10 ms radio frame is comprised of 15 time slots. Each of the time slots includes a Pilot field 312, a TFCI field 313, an FBI field 314, and a TPC field 315. The Pilot field 312 enables a cell or cells receiving the UL_DPCH to estimate a condition of an uplink channel transmitted from a UE to the cell. The TFCI field 313, a field (or channel) for transmitting TFCI of the UL_DPDCH, indicates a channelization code and a data rate used for the UL_DPDCH, decoding information, and the type of data transmitted over the UL_DPDCH. The FBI (Feedback Information) field 314 is used to transmit closed-loop antenna control information, in the case where closed-loop antenna-based transmission is used for downlink transmission from a Node B or cell to a UE. In addition, the FBI field 314 is used to transmit control information for supporting SSDT (Site Selection Diversity Transmission), in the case where a UE, though it is located in a soft handover region, supports the SSDT for receiving DL_DPDCH from only one Node B having a good downlink channel condition. The SSDT is a technique which has evolved into FCS and newly introduced to the HSDPA. The TPC field 315 is used to transmit a power control command for controlling transmission power of downlink channels transmitted from a Node B (or cell) to a UE.

FIG. 3B illustrates a secondary uplink dedicated physical control channel (S-UL_DPCCH) for transmitting control information from an HSDPA UE to a cell. As stated above, the HSDPA UE must transmit ACK or NACK information for a received packet to a Node B (or cell) which has transmitted HSDPA data, and can transmit channel measurement information for selecting an MCS level or a best cell. Such information is transmitted over the S-UL_DPCCH. The S-UL_DPCCH may transmit ACK/NACK information 323 and a channel quality indicator (CQI) 325 for a 3-time slot period. The reason for introducing the S-UL_DPCCH to the HSDPA is to maintain compatibility with the existing 3GPP communication system by introducing a new channel for the HSDPA service without modifying a structure of the conventional UL_DPCH. The S-UL_DPCCH is transmitted only to a cell which transmits HSDPA data.

The CQI 325, information indicating a measured quality of a channel transmitted from a Node B transmitting HSDPA data to a UE receiving the HSDPA data, is transmitted from the UE to the Node B as information for selecting an MCS level or selecting the best cell in the FCS. The CQI may be calculated as a ratio of a signal to noise or interference, applied to a UE. An amount of the CQI information is variable according to an interval at which a UE reports a range of the signal-to-noise (or interference). ratio to a Node B in communication with the UE. For example, if the UE reports the signal-to-noise ratio to the Node B at intervals of 1 dB from −20 dB to +12 dB, the information amount becomes 32 (i.e., the information is transmitted 32 times). The CQI is very important control information that is used by a Node B transmitting HSDPA data to determine a rate of data received by a UE receiving the HSDPA data. If the CQI has an error, a Node B supporting the HSDPA incorrectly selects an MCS level. As a result, although the UE receiving HSDPA data has a good channel condition, the Node B transmits data at a low data rate, thus reducing transmission efficiency. Alternatively, although the UE has a poor channel condition, the Node B may transmit data at a high data rate, causing an error during data reception at the UE.

SUMMARY OF THE INVENTION

It is, therefore, an object of the present invention to provide an apparatus and method for encoding information transmitted over an uplink control channel in a CDMA mobile communication system.

It is another object of the present invention to provide an apparatus and method for encoding CQI information transmitted over an uplink control channel in a mobile communication system supporting high-speed downlink packet transmission.

It is further another object of the present invention to provide an apparatus and method for generating a coded symbol having optimal coding performance according to a length of quality information of a downlink channel in encoding the quality information of the downlink channel.

It is yet another object of the present invention to provide an apparatus and method for making an encoder with a memory to encode quality information of a downlink channel.

It is still another object of the present invention to provide an apparatus and method for encoding quality information of a downlink channel before transmission in order to secure transmission reliability of the channel quality information.

It is still another object of the present invention to provide an apparatus and method for generating a coded symbol having optimal performance even though an amount of the quality information of the downlink channel is changed.

In accordance with a first aspect of the present invention, there is provided a coding method in a mobile communication system, for receiving 5 information bits and generating a code symbol stream comprised of 20 coded symbols. The coding method comprises generating 5 code symbol streams having a length 32 by encoding the 5 individual information bits with different Walsh codes having a length 32, and generating a code symbol stream comprised of 32 coded symbols by XORing the 5 code symbol streams in a symbol unit; and generating a code symbol stream comprised of 20 coded symbols by puncturing $2^{nd}$, $4^{th}$, $5^{th}$, $6^{th}$, $8^{th}$, $9^{th}$, $10^{th}$, $11^{th}$, $12^{th}$, $13^{th}$, $14^{th}$, and $30^{th}$ coded symbols among the 32 coded symbols.

In accordance with a second aspect of the present invention, there is provided a coding apparatus in a mobile communication system, for receiving 5 input information bits, generating 5 code symbol streams having a length 32 by encoding the 5 individual input information bits with different Walsh codes having a length 32, and generating a code symbol stream comprised of 32 coded symbols by XORing the 5 code symbol streams in a symbol unit, thereby to generate a code symbol stream comprised of 20 coded symbols. The coding apparatus comprises a puncturer for generating a code symbol stream comprised of 20 coded symbols by puncturing $2^{nd}$, $4^{th}$, $5^{th}$, $6^{th}$, $8^{th}$, $9^{th}$, $10^{th}$, $11^{th}$, $12^{th}$, $13^{th}$, $14^{th}$, and $30^{th}$ coded symbols among the 32 coded symbols.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENT

A preferred embodiment of the present invention will be described herein below with reference to the accompanying drawings. In the following description, well-known functions or constructions are not described in detail since they would obscure the invention in unnecessary detail.

The present invention provides a method for encoding information transmitted over a secondary uplink dedicated physical control channel (S-UL_DPCCH) for HSDPA before transmission.

Figure 1:
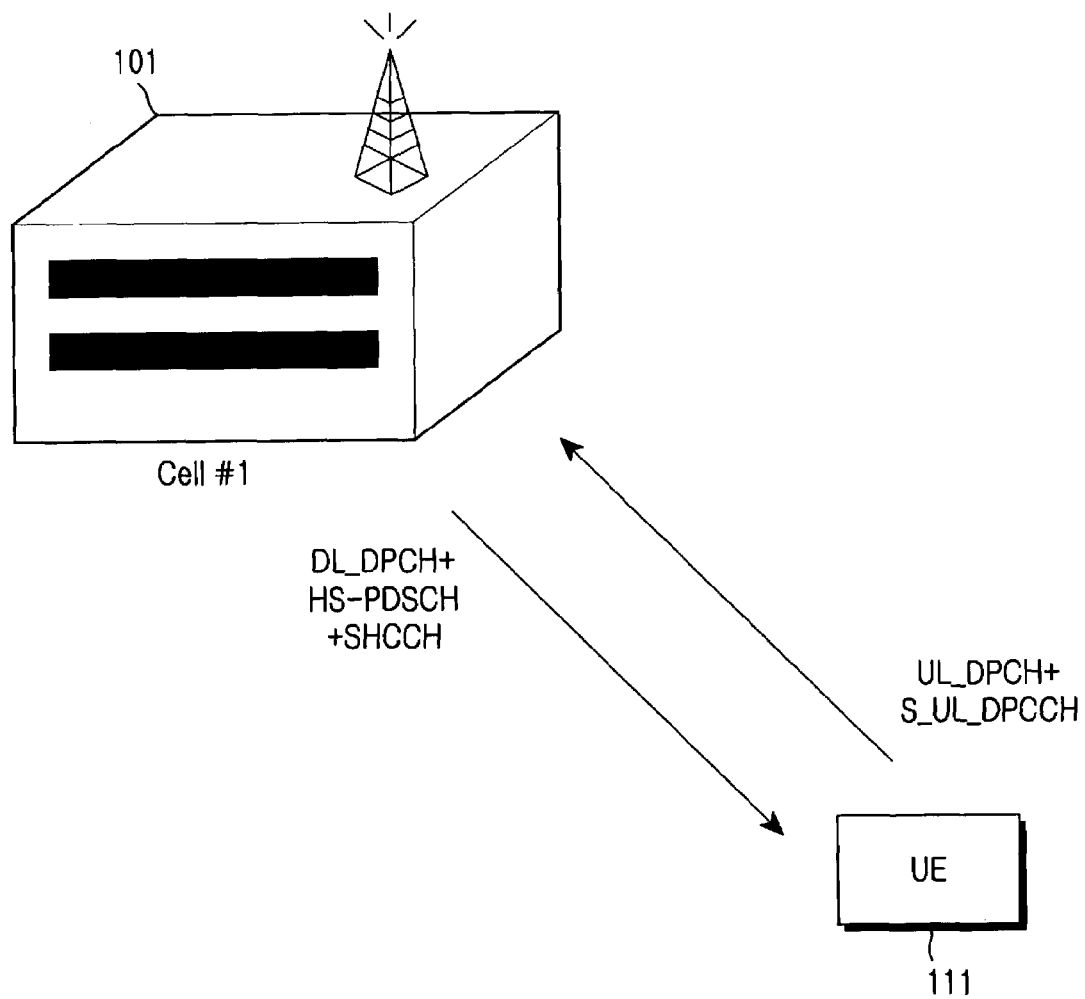
FIG. 1 illustrates uplink and downlink channels between a Node B and a UE in a mobile communication system supporting HSDPA.
Figure 2A:
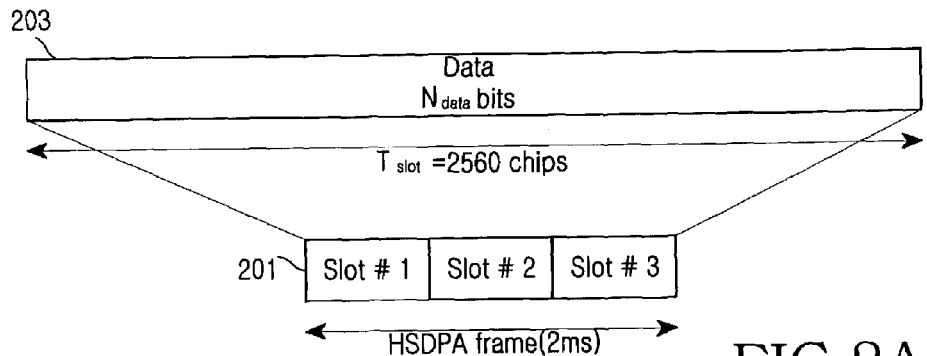
FIGS. 2A to 2C illustrate structures of downlink channels transmitted from a Node B to a UE in a mobile communication system supporting HSDPA.
Figure 2B:
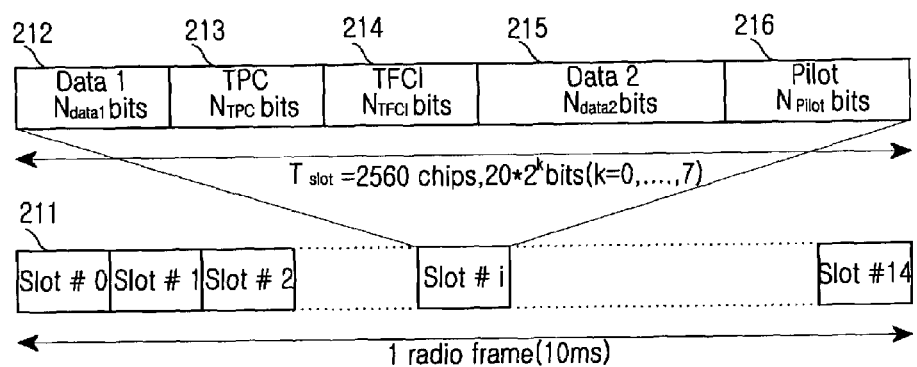
Figure 2C:
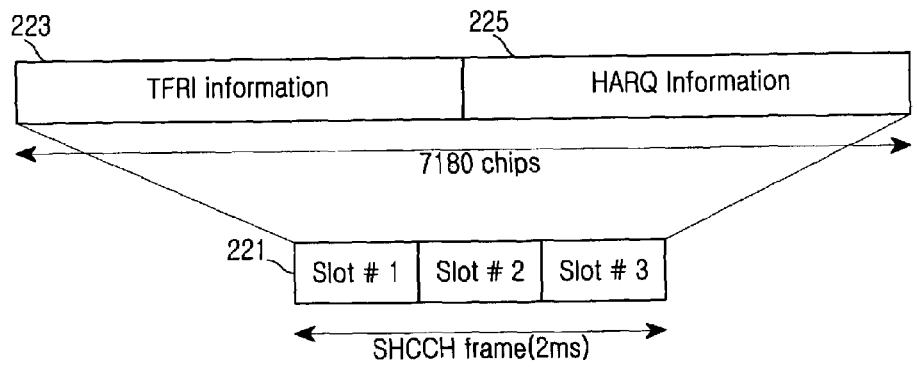
Figure 3A:
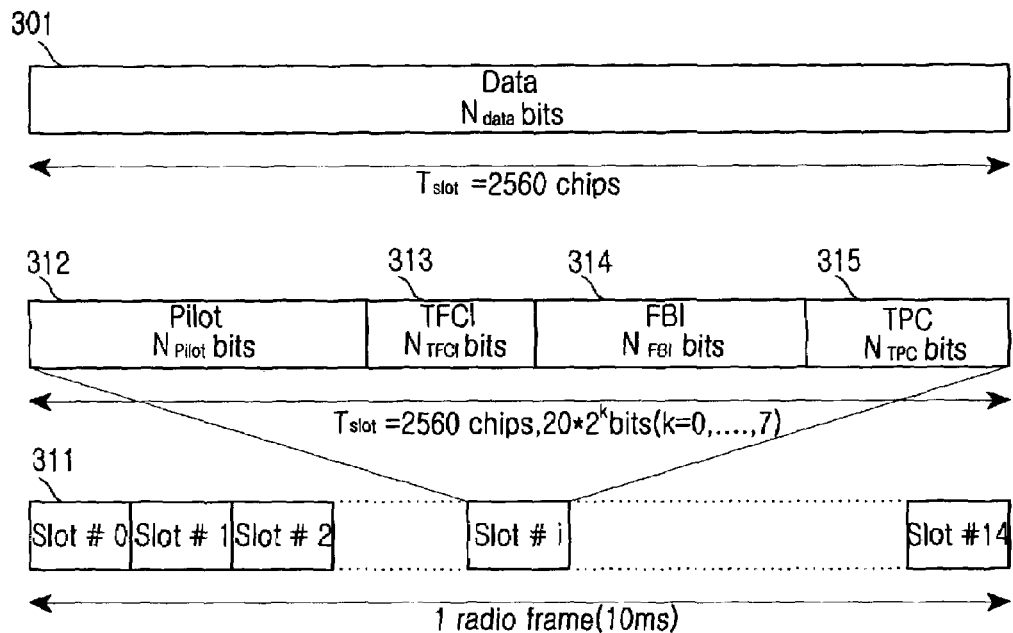
FIGS. 3A and 3B illustrate structures of uplink channels transmitted from a UE to a Node B in a mobile communication system supporting HSDPA.
Figure 3B:
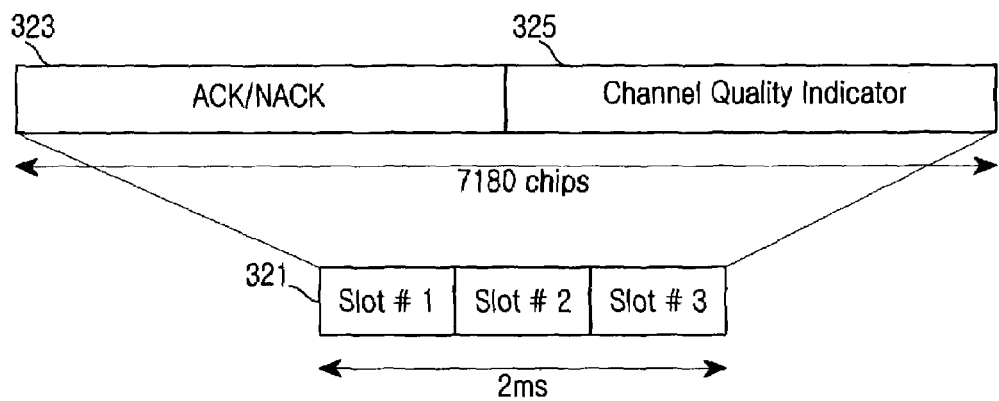

Although position and length of the ACK/NACK and CQI information shown in FIG. 3B can be changed, the present invention provides a method for encoding the CQI in the case where a spreading factor of a channelization code used for the S-UL_DPCCH is 256. In FIG. 3B, one time slot is a 256-chip length. When the spreading factor 256 is used, the total amount of information that can be transmitted for a 3-time slot period is 30 bits. That is, for the 30-bit period, ACK/NACK information and CQI are transmitted. Due to an advantage of packet transmission scheduling for the HSDPA, the ACK/NACK and CQI are transmitted over different time slots. The ACK/NACK is an affirmative or negative response transmitted by a UE in reply to an n-channel SAW packet received over HS-PDSCH. Upon receiving the ACK, a Node B (or cell) transmits a next n-channel SAW packet. However, upon receiving the NACK, the Node B retransmits the previously transmitted packet. Therefore, an actual amount of the ACK/NACK information is 1 bit. For example, the 1-bit information is set to 1 for ACK and 0 for NACK. In a system supporting the HARQ, the ACK/NACK information is very important information that should not have an error. However, since an amount of the ACK/NACK information is very small, the ACK/NACK information can be repeatedly transmitted 10 times for one time slot. Since an optimal code for the 1-bit information is a repetition code, the ACK/NACK information is coded with an optimal code before being transmitted. Therefore, the CQI can be transmitted using the remaining 20 bits on the S-UL_DPCCH that can transmit 30 bits.

If a coded symbol of the CQI has a 20-bit length, then (20,2) code, (20,3) code, (20,4) code and (20,5) code are required for CQI information lengths of 2, 3, 4 and 5, respectively. Therefore, there is a demand for a simple, high-performance encoder capable of generating the 4 kinds of codes stated above.

The present invention generates the 4 kinds of codes using a (32,5) second order Reed-Muller code used for encoding TFCI in 3GPP, a standard for a $3^{rd}$ generation asynchronous mobile communication system. By reusing the existing code stated above, it is possible to reduce the hardware complexity. In addition, by reusing the existing (32,5) second order Reed-Muller code, it is possible to secure compatibility with other Node Bs and UEs not supporting the present invention. That is, Node Bs and UEs not supporting the HSDPA use the existing (32,5) second order Reed-Muller code for TFCI coding, whereas Node Bs and UEs supporting the HSDPA can use the existing (32,5) second order Reed-Muller code for TFCI coding and CQI information bit coding.

In general, Hamming distance distribution for codewords of the error correcting codes can serve as a measure indicating the performance of linear error correcting codes. The "Hamming distance" means the number of non-zero symbols in a codeword. That is, for a certain codeword '0111', the number of 1's included in the codeword is 3, so the Hamming distance is 3. The least value among the Hamming distance values is called a "minimum distance $d_{min}$," and an increase in the minimum distance of the codeword improves the error correcting performance of the error correcting codes. In other words, the "optimal code"means a code having the optimal error correcting performance. This is disclosed in detail in a paper, *The Theory of Error-Correcting Codes*, F. J. Macwilliams, N. J. A. Sloane, North-Holland.

In addition, in order to use a single encoder structure for the encoders having different lengths for a reduction in the hardware complexity, it is preferable to perform puncturing on the existing (32,5) second order Reed-Muller code. However, for the puncturing, a puncturing pattern for a coded symbol is required. During the puncturing, the minimum distance of the code is changed according to puncturing positions. Therefore, it is preferable to calculate the puncturing positions such that the punctured code has the minimum distance. The puncturing technique means calculating a code having a long length and then puncturing several specified symbols among coded symbols constituting the code, thereby to match a length of the code to a length of an actual transmission code.

Therefore, in the following description, the present invention will provide an encoder structure for generating an optimal (20,2) code for 4 kinds of CQI information bits, or 2-bit CQI information, by puncturing a (32,5) subcode of the second order Reed-Muller code, an encoder structure for generating an optimal (20,3) code for 8 kinds of CQI information bits, or 3-bit CQI information, an encoder structure for generating an optimal (20,4) code for 16 kinds of CQI information bits, or 4-bit CQI information, and an encoder structure for generating an optimal (20,5) code for 32 kinds of CQI information bits, or 5-bit CQI information.

Figure 4:
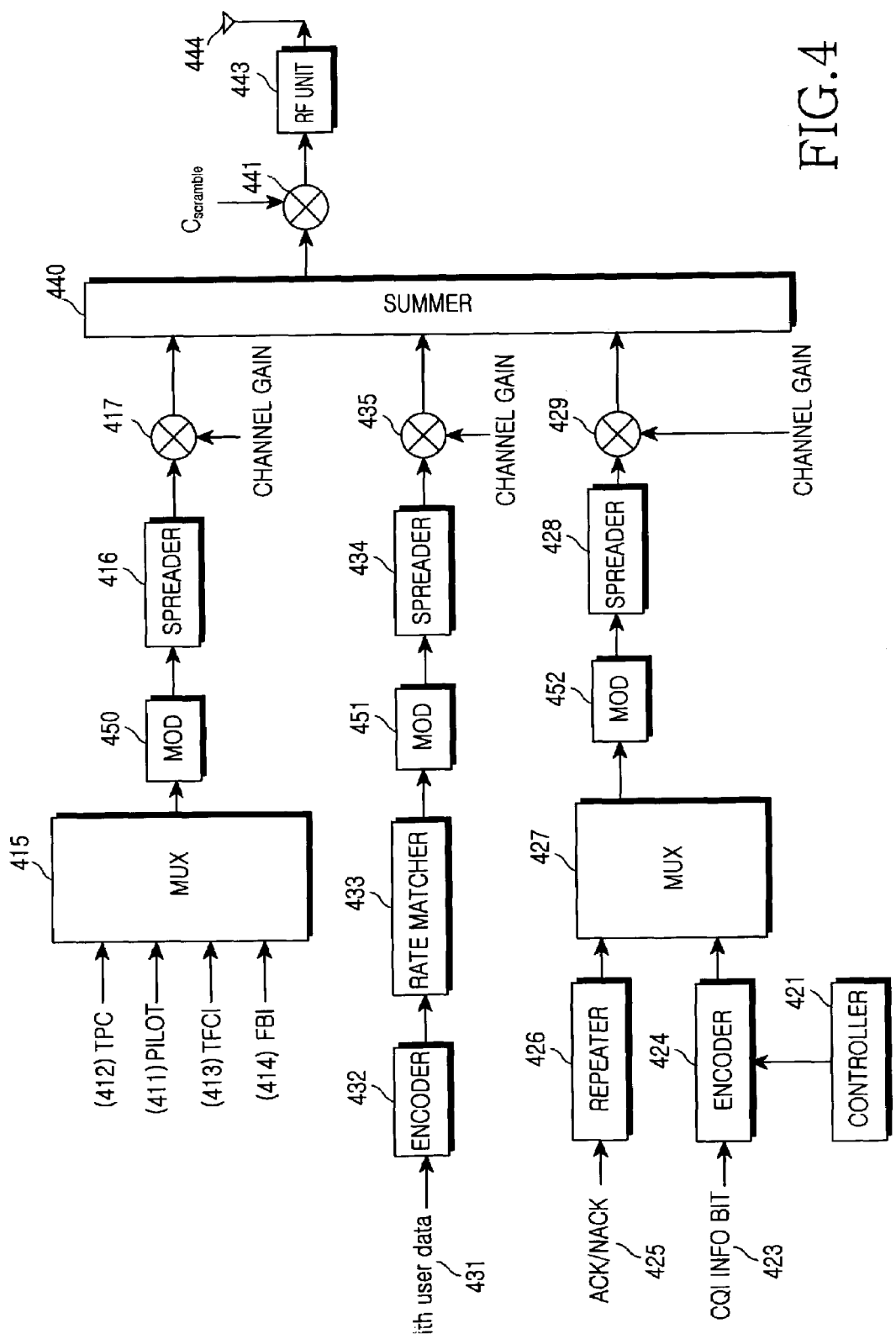
FIG. 4 illustrates a structure of a transmitter according to an embodiment of the present invention.

FIG. 4 illustrates a structure of a UE transmitter according to an embodiment of the present invention. Referring to FIG. 4, a multiplexer 415 generates UL_DPCCH by multiplexing TPC 412 for controlling downlink transmission power, Pilot 411 for estimation of a downlink channel condition, TFCI 413 indicating the type and rate of data included in UL_D-PDCH, and FBI 414 for transmitting feedback information for SSDT or closed-loop antenna diversity. The UL_DPCCH output from the multiplexer 415 is modulated by a modulator 450, and then spread by a spreader 416 with a channelization code for the UL_DPCCH. A multiplier 417 multiplies the spread UL_DPCCH by a channel gain for determining transmission power of the UL_DPCCH, and provides its output to a summer 440.

User data 431 or upper layer signaling information is encoded by an encoder 432 with a proper code, and then rate-matched by a rate matcher 433 so that the coded user data or upper layer signaling information should be converted into a transmission format suitable for a physical channel. The rate matching is performed through puncturing for reducing a length of the data and repetition for increasing a length of the data. An output signal of the rate matcher 433 is provided to a modulator 451, and the modulator 451 modulates the provided signal by a proper modulation technique. An output signal of the modulator 451 is spread into UL_DPDCH by a spreader 434, and then multiplied by a multiplier 435 by a channel gain for the UL_DPDCH. An output of the multiplier 435 is provided to the summer 440. In comparison with the channel gain applied to the multiplier 417, the channel gain applied to the multiplier 435 can be determined depending on a data rate difference between UL_DPCCH and UL_DPDCH.

A multiplexer 427 generates S-UL_DPCCH by multiplexing 10-bit ACK/NACK information obtained by a r7peater 426 by repeating ACK/NACK 425, which is control information for n-channel SAW HARQ, and a 20-bit CQI value obtained by an encoder 424 by encoding CQI 423. The encoder 424, under the control of a controller 421, encodes the CQI 423 by a coding technique proper for the input CQI. The S-UL_DPCCH output from the multiplexer 427 is modulated by a modulator 452 using a proper modulation technique, and then spread by a spreader 428 with a channelization code for the S_UL_DPCCH. The S_UL_DPCCH spread by the spreader 428 is multiplied by a multiplier 429 by a channel gain for the S-UL_DPCCH, and then provided to the summer 440.

The summer 440 sums up the provided uplink signals, and provides its output to a multiplier 441. Since the uplink signals summed by the summer 440 were multiplied by different channelization codes for identification, a Node B receiving the signals can decode desired signals. The multiplier 441 scrambles the output signal of the summer 440 with a unique scrambling code $C_{scramble}$ so that the Node B can distinguish the uplink signal from uplink signals from other UEs. An output signal of the multiplier 441 is multiplied by a carrier signal by an RF (Radio Frequency) unit 443, and then transmitted to the Node B through an antenna 444.

Figure 6:
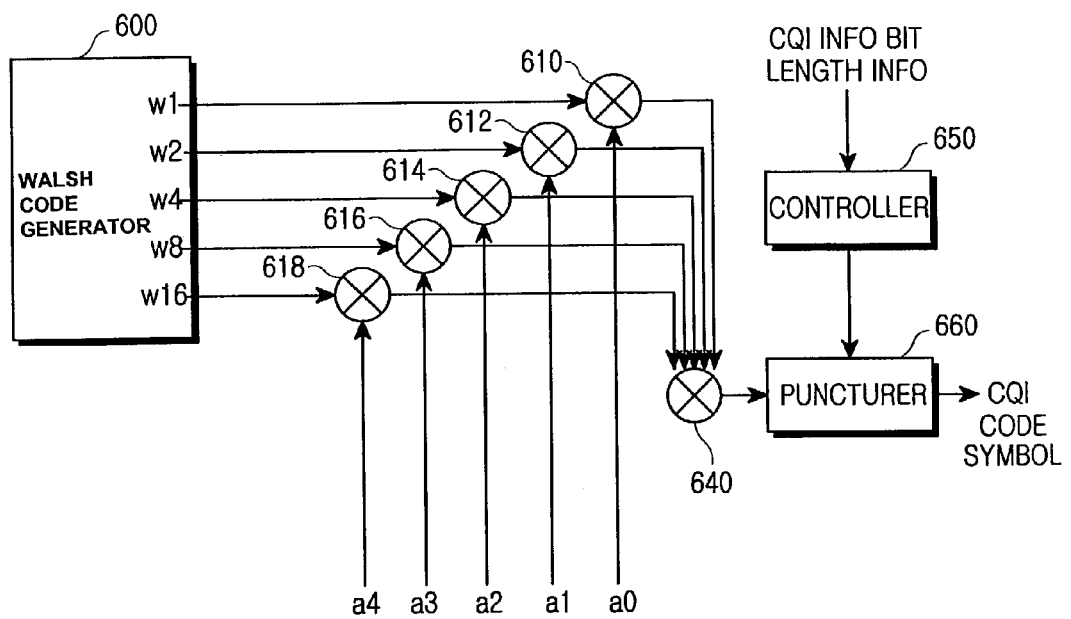
FIG. 6 illustrates a detailed structure of the encoder shown in FIG. 4.

A detailed structure of the encoder 424 used for CQI coding is illustrated in FIG. 6. A controller 650 of FIG. 6 is identical to the controller 421 of FIG. 4. With reference to FIG. 6, an operation of an encoder according to an embodiment of the present invention will be described in detail for the case where the CQI information has a length of 2, 3, 4 and 5 bits, and the number of coded symbols is 20.

First, reference will be made to the case where the encoder according to the present invention serves as an (20,2) encoder. Two input bits a0 and a1 are provided to the encoder and the remaining input bits a2, a3 and a4 are set to 0. The input bit a0 is applied to a multiplier 610, the input bit a1 to a multiplier 612, the input bit a2 to a multiplier 614, the input bit a3 to a multiplier 616, and the input bit a4 to a multiplier 618. At the same time, a Walsh code generator 600 generates 5 different basis codewords W1, W2, W4, W8 and W16 each having a length of 32 bits. The basis codeword W1=10101010101011010101010101010100 and the basis codeword W2=01100110011001101100110011001100 are provided to the multiplier 610 and the multiplier 612, respectively. The multiplier 610 and the multiplier 612 multiply the input bits a0 and a1 by the basis codewords W1 and W2 in a symbol unit (or symbol by symbol), respectively, and provide their outputs to an exclusive OR (XOR) operator 640. Further, the Walsh code generator 600 provides the other basis codewords W4, W8 and W16 to the multipliers 614, 616 and 618, respectively. However, since the input bits a2, a3 and a4 applied to the multipliers 614, 616 and 618 are all 0s, the multipliers 614, 616 and 618 output 0s. Therefore, the outputs of the multipliers 614, 616 and 618 cannot affect an output of the exclusive OR operator 640. That is, a result determined by XORing the outputs of the multipliers 610, 612, 614, 616 and 618 by the exclusive OR operator 640 is identical to a result determined by XORing the outputs of the multipliers 610 and 612.

32 symbols output from the exclusive OR operator 640 are provided to a puncturer 660. At the same time, if CQI information bit length information is applied to the controller 650, the controller 650 provides the puncturer 660 with a control signal for puncturing positions corresponding to the code length. The puncturer 660 punctures $3^{rd}$, $7^{th}$, $11^{th}$, $18^{th}$, $22^{nd}$, $25^{th}$, $26^{th}$, $27^{th}$, $28^{th}$, $29^{th}$, $30^{th}$, and $31^{st}$ coded symbols among a total of 32 coded symbols of $0^{th}$ to $31^{st}$ coded symbols according to the control signal, and outputs 20 non-punctured coded symbols.

Next, reference will be made to the case where the encoder according to the present invention serves as an (20,3) encoder. Three input bits a0, a1 and a2 are provided to the encoder and the remaining input bits a3 and a4 are set to 0. The input bit a0 is applied to a multiplier 610, the input bit a1 to a multiplier 612, the input bit a2 to a multiplier 614, the input bit a3 to a multiplier 616, and the input bit a4 to a multiplier 618. At the same time, the Walsh code generator 600 generates 5 different basis codewords W1, W2, W4, W8 and W16 each having a length of 32 bits. The basis codeword W1=10101010101011010101010101010100, the basis codeword W2=01100110011001101100110011001100 and the basis codeword W4=00011110000111100011110000111100 are provided to the multiplier 610, the multiplier 612 and the multiplier 614, respectively. The multiplier 610, the multiplier 612 and the multiplier 614 multiply the input bits a0, a1 and a2 by the basis codewords W1, W2 and W4 in a symbol unit, respectively, and provide their outputs to the exclusive OR operator 640. Further, the Walsh code generator 600 provides the other basis codewords W8 and W16 to the multipliers 616 and 618, respectively. However, since the input bits a3 and a4 applied to the multipliers 616 and 618 are all 0s, the multipliers 616 and 618 output 0s. Therefore, the outputs of the multipliers 616 and 618 cannot affect an output of the exclusive OR operator 640. That is, a result determined by XORing the outputs of the multipliers 610, 612, 614, 616 and 618 by the exclusive OR operator 640 is identical to a result determined by XORing the outputs of the multipliers 610, 612 and 614.

32 symbols output from the exclusive OR operator 640 are provided to the puncturer 660. At the same time, if CQI information bit length information is applied to the controller 650, the controller 650 provides the puncturer 660 with a control signal for puncturing positions corresponding to the code length. The puncturer 660 punctures $7^{th}$, $21^{st}$, $22^{nd}$, $23^{rd}$, $24^{th}$, $25^{th}$, $26^{th}$, $27^{th}$, $28^{th}$, $29^{th}$, $30^{th}$, and $31^{st}$ coded symbols among a total of 32 coded symbols of $0^{th}$ to $31^{st}$ coded symbols according to the control signal, and outputs 20 non-punctured coded symbols.

Next, reference will be made to the case where the encoder according to the present invention serves as an (20,4) encoder. Four input bits a0, a1, a2 and a3 are provided to the encoder and the remaining input bit a4 is set to 0. The input bit a0 is applied to a multiplier 610, the input bit a1 to a multiplier 612, the input bit a2 to a multiplier 614, the input bit a3 to a multiplier 616, and the input bit a4 to a multiplier 618. At the same time, the Walsh code generator 600 generates 5 different basis codewords W1, W2, W4, W8 and W16 each having a length of 32 bits. The basis codeword W1=10101010101011010101010101010100, the basis codeword W2=01100110011001101100110011001100, the basis codeword W4=00011110000111100011110000111100 and the basis codeword W8=00000001111111100000001111111100 are provided to the multiplier 610, the multiplier 612, the multiplier 614 and the multiplier 616, respectively. The multiplier 610, the multiplier 612, the multiplier 614 and the multiplier 616 multiply the input bits a0, a1, a2 and a3 by the basis codewords W1, W2, W4 and W8 in a symbol unit, respectively, and provide their outputs to the exclusive OR operator 640. Further, the Walsh code generator 600 provides the other basis codeword W16 to the multiplier 618. However, since the input bit a4 applied to the multiplier 618 is 0, the multiplier 618 outputs 0. Therefore, the output of the multiplier 618 cannot affect an output of the exclusive OR operator 640. That is, a result determined by XORing the outputs of the multipliers 610, 612, 614, 616 and 618 by the exclusive OR operator 640 is identical to a result determined by XORing the outputs of the multipliers 610, 612, 614 and 616.

32 symbols output from the exclusive OR operator 640 are provided to the puncturer 660. At the same time, if CQI information bit length information is applied to the controller 650, the controller 650 provides the puncturer 660 with a control signal for puncturing positions corresponding to the code length. The puncturer 660 punctures $17^{th}$, $19^{th}$, $20^{th}$, $21^{st}$, $23^{rd}$, $24^{th}$, 25th, $26^{th}$, $27^{th}$, $28^{th}$, $30^{th}$, and $31^{st}$ coded symbols among a total of 32 coded symbols of $0^{th}$ to $31^{st}$ coded symbols according to the control signal, and outputs 20 non-punctured coded symbols.

Finally, reference will be made to the case where the encoder according to the present invention serves as an (20,5) encoder. Five input bits a0, a1, a2, a3 and a4 are provided to the encoder. The input bit a0 is applied to a multiplier 610, the input bit a1 to a multiplier 612, the input bit a2 to a multiplier 614, the input bit a3 to a multiplier 616, and the input bit a4 to a multiplier 618. At the same time, the Walsh code generator 600 generates 5 different basis codewords W1, W2, W4, W8 and W16 each having a length of 32 bits. The basis codeword W1=10101010101011010101010101010100, the basis codeword W2=01100110011001101100110011001100, the basis codeword W4=00011110000111100011110000111100, the basis codeword W8=00000001111111100000001111111100 and the basis codeword W16=00000000000000011111111111111101 are provided to the multiplier 610, the multiplier 612, the multiplier 614, the multiplier 616 and the multiplier 618, respectively. The multiplier 610, the multiplier 612, the multiplier 614, the multiplier 616 and the multiplier 618 multiply the input bits a0, a1, a2, a3 and a4 by the basis codewords W1, W2, W4, W8 and W16 in a symbol unit, respectively, and provide their outputs to the exclusive OR operator 640.

32 symbols output from the exclusive OR operator 640 are provided to the puncturer 660. At the same time, if CQI information bit length information is applied to the controller 650, the controller 650 provides the puncturer 660 with a control signal for puncturing positions corresponding to the code length. The puncturer 660 punctures $2^{nd}$, $4^{th}$, $5^{th}$, $6^{th}$, $8^{th}$, $9^{th}$, $10^{th}$, $11^{th}$, $12^{th}$, $13^{th}$, $14^{th}$, and $30^{th}$ coded symbols among a total of 32 coded symbols of $0^{th}$ to $31^{st}$ coded symbols according to the control signal, and outputs 20 non-punctured coded symbols.

Table 1 illustrates puncturing patterns capable of realizing all the encoders based on the individual CQI information bit lengths proposed in the present invention. The puncturing patterns of Table 1 are applied to the puncturer 660 of FIG. 6. Table 1 provides puncturing patterns for realizing a (20,k) code, where k=2, 3, 4, and 5.

step 1204, the controller 650 outputs 20 code symbols by puncturing the generated code symbol stream according to the determined puncturing pattern. In step 1205, the controller 650 outputs the punctured CQI code symbols as a CQI codeword. However, if it is determined in step 1201 that the encoder will generate a TFCI codeword, the controller 650 generates in step 1211 TFCI code symbols by encoding TFCI information bits with a (32,5) second order Reed-Muller code, and then generates a TFCI codeword in step 1213.

Figure 5:
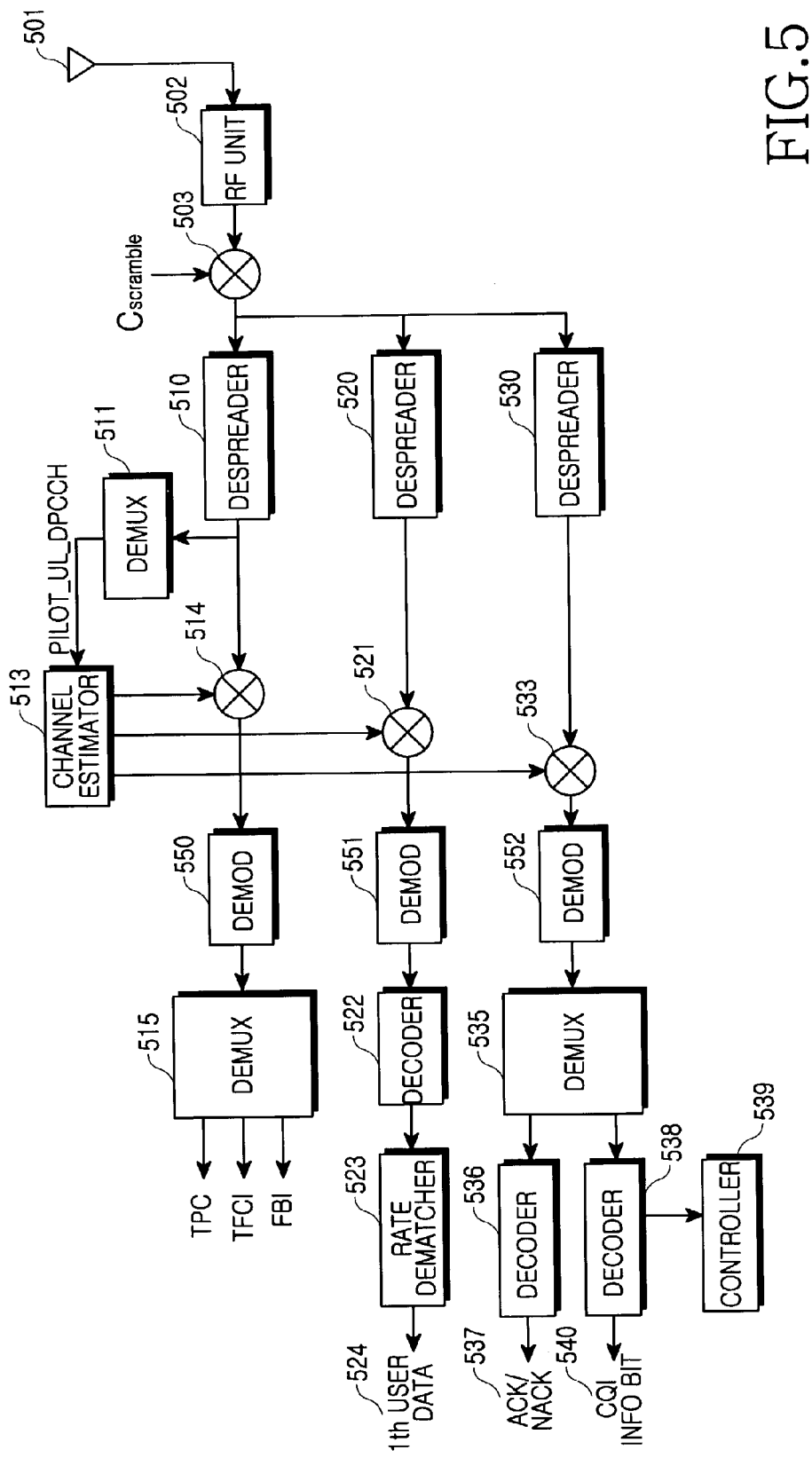
FIG. 5 illustrates a structure of a receiver according to an embodiment of the present invention.

FIG. 5 illustrates a structure of a Node B receiver according to an embodiment of the present invention. Referring to FIG. 5, a UE signal received through an antenna 501 is converted to a baseband signal by an RF unit 502, and then descrambled by a multiplier 503 with a scrambling code $C_{scramble}$ used by the UE. The scrambling code used by the UE enables the Node B to distinguish signals received from a plurality of UEs. The UE signal output from the multiplier 503 is separated into UL_DPCCH, UL_DPDCH and S-UL_DPCCH by a despreader 510, a despreader 520 and a despreader 530, respectively. That is, for despreading, the despreader 510, the despreader 520 and the despreader 530 multiply the UE signal by channelization codes used for UL_DPCCH, UL_DPDCH and S-UL_DPCCH, respectively. A demultiplexer 511 extracts only Pilot field from a UL_DPCCH signal output from the despreader 510, and

TABLE 1

| Code | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 |
|---|---|---|---|---|---|---|---|---|---|---|---|---|---|---|---|---|---|---|---|---|---|---|---|---|---|---|---|---|---|---|---|---|
| (20,2) | 1 | 1 | 1 | 0 | 1 | 1 | 1 | 0 | 1 | 1 | 1 | 0 | 1 | 1 | 1 | 1 | 1 | 1 | 0 | 1 | 1 | 1 | 0 | 1 | 1 | 0 | 0 | 0 | 0 | 0 | 0 | 0 |
| (20,3) | 1 | 1 | 1 | 1 | 1 | 1 | 1 | 0 | 1 | 1 | 1 | 1 | 1 | 1 | 1 | 1 | 1 | 1 | 1 | 1 | 1 | 0 | 0 | 0 | 0 | 0 | 0 | 0 | 0 | 0 | 0 | 0 |
| (20,4) | 1 | 1 | 1 | 1 | 1 | 1 | 1 | 1 | 1 | 1 | 1 | 1 | 1 | 1 | 1 | 1 | 1 | 0 | 1 | 0 | 0 | 0 | 1 | 0 | 0 | 0 | 0 | 0 | 0 | 1 | 0 | 0 |
| (20,5) | 1 | 1 | 0 | 1 | 0 | 0 | 0 | 1 | 0 | 0 | 0 | 0 | 0 | 0 | 0 | 1 | 1 | 1 | 1 | 1 | 1 | 1 | 1 | 1 | 1 | 1 | 1 | 1 | 1 | 1 | 0 | 1 |

In Table 1, "0" represents a position of a punctured coded symbol, and "1" represents a position of a non-punctured coded symbol. The individual codes having the coded symbols generated using the puncturing patterns of Table 1 have optimal performance. Comparing performances of the codes proposed in the invention on the basis of the minimum distance $d_{min}$ between codewords, a (20,2) codeword has $d_{min}=13$, a (20,3) codeword has $d_{min}=11$, a (20,4) codeword has $d_{min}=10$, and a (20,5) codeword has $d_{min}=9$. The minimum distances $d_{min}$ of the codes proposed in the present invention are correctly coincident with the above-stated values, when the codes are compared with an optimal code taking into consideration the number of input bits and the number of symbol bits.

Figure 12:
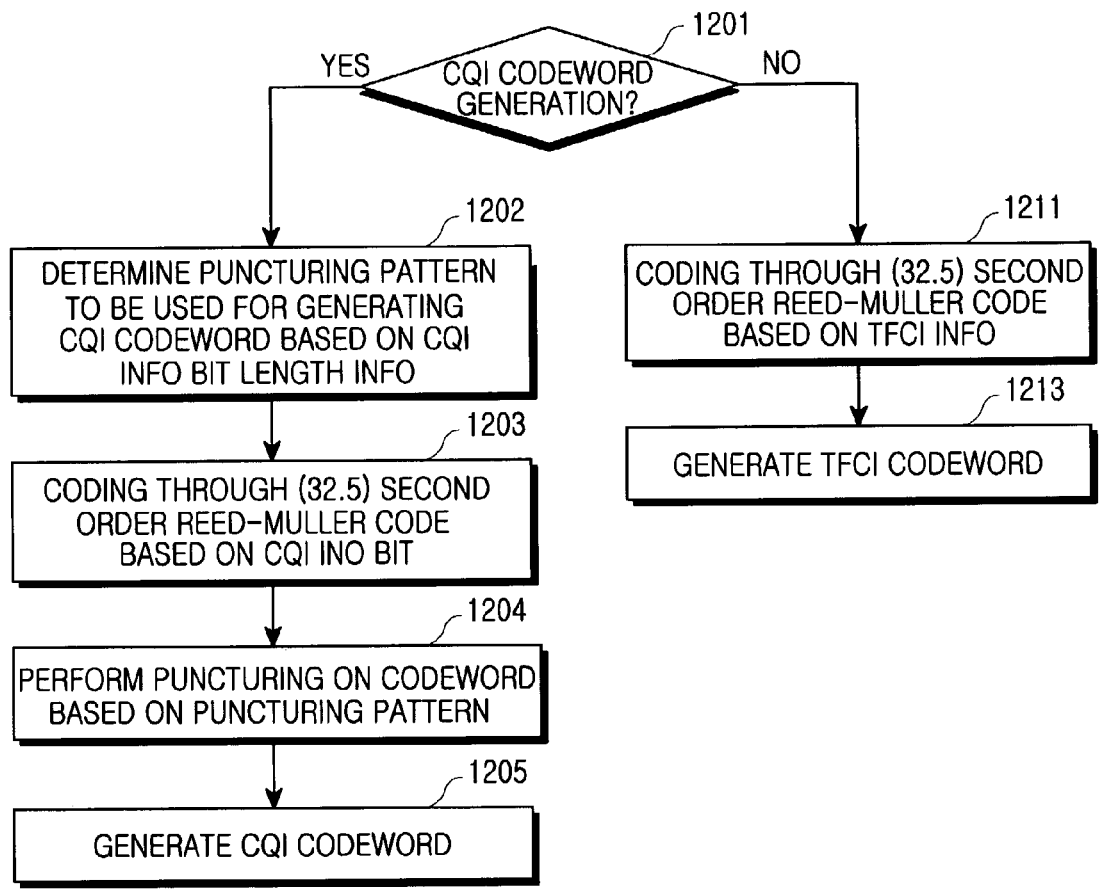
FIG. 12 is a flowchart illustrating an operation of the encoder shown in FIG. 6.

FIG. 12 is a flowchart illustrating an operation of the encoder shown in FIG. 6. Although only the CQI coding process has been described with reference to FIG. 6, the encoder structure of FIG. 6 can generate a conventionally (32,5) codeword for TFCI as well, and the generating process will be described with reference to FIG. 12.

Referring to FIG. 12, the controller 650 determines in step 1201 whether the encoder will generate a CQI codeword or a TFCI codeword. If it is determined in step 1201 that the encoder will generate CQI codeword, the controller 650 determines in step 1202 a puncturing pattern to be used for generating a CQI codeword based on CQI information bit length information. In step 1203, the controller 650 generates a code symbol stream (or a stream of coded symbols) comprised of 32 CQI code symbols using input CQI information bits and a (32,5) second order Reed-Muller code. In provides the extracted Pilot field to a channel estimator 513. A pilot signal received over the Pilot field is used to estimate an uplink channel environment from the UE to the Node B. The channel estimator 513 estimates a level of the pilot signal, and generates a TPC command for controlling transmission power of UL_DPCH based on the estimated level of the pilot signal. Further, the UL_DPCCH signal from the despreader 510 is provided to a multiplier 514. The multiplier 514 multiplies the UL_DPCCH signal by a channel estimation value from the channel estimator 513, for channel compensation. The channel-compensated signal is demodulated by a demodulator 550, and then demultiplexed (or separated) into TPC 516, TFCI 517 and FBI 518 by a demultiplexer 515.

A UL_DPDCH signal output from the despreader 520 is channel-compensated by a multiplier 521 using a channel estimation value from the channel estimator 513, and then demodulated by a demodulator 551. The UL_DPDCH signal demodulated by the demodulator 551 is decoded by a decoder 522. The UL_DPDCH signal decoded by the decoder 522 undergoes rate dematching in a rate dematcher 523, thus being restored to $i^{th}$ user data 524 or an upper layer signaling message.

An S-UL_DPCCH signal output from the despreader 530 is channel-compensated by a multiplier 533 using a channel estimation value from the channel estimator 513, and then demodulated by a demodulator 552. The S-UL_DPCCH signal demodulated by the demodulator 552 is provided to a demultiplexer 535, where it is separated into ACK/NACK information and a channel report message. The separated ACK/NACK information is decoded into an ACK/NACK bit 537 by a decoder 536. Since the ACK/NACK information can be represented by a bit stream obtained by repeating 1-bit ACK/NACK 10 times, the decoder 536 performs a function of analyzing the bit stream. The separated channel report message is provided to a decoder 538, where it is decoded into 1 to 5 CQI information bits under the control of a controller 539. That is, the decoder 538 receives 20 code symbols (or coded symbols) and outputs 2 to 5 CQI information bits by decoding the received code symbols based on CQI information bit length information. Therefore, the decoder 538 serves as (20,2) decoder, (20,3) decoder, (20,4) decoder and (20,5) decoder. The decoder 536 and the decoder 538 can be defined as a decoder having the same coding technique as that used by the UE and having a decoding function for the repeated transmission.

The controller 539 controls the decoder 538 using information on the CQI information bit length. The information on the CQI information bit length is a value previously agreed between a Node B receiving the CQI information bits and a UE transmitting the CQI information bits. The information on the CQI information bit length, being system information, is transmitted to either all UEs in a Node B transmitting the system information, over a shared channel, or only to a UE receiving an HSDPA service over upper layer signaling. Alternatively, as system information of UEs is fixed according to their reception capability or signal measurement capability, the UEs may transmit the information to the Node B, or all Node Bs of a service provider for the HSDPA service may use the same system information determined by the service provider.

Figure 7:
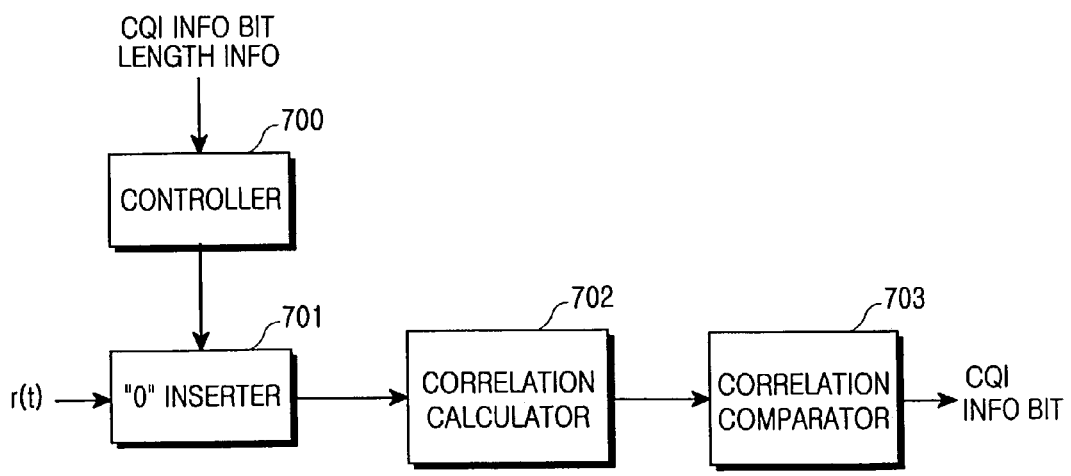
FIG. 7 illustrates a detailed structure of the decoder shown in FIG. 5.

FIG. 7 illustrates a detailed structure of the controller 539 and the decoder 538 shown in FIG. 5. A controller 700 of FIG. 7 is identical in function to the controller 539 of FIG. 5.

Referring to FIG. 7, a symbol (or a channel report message r(t)) received from the despreader 535 is applied to a zero (0) inserter 701, and at the same time, CQI information bit length information 730 is applied to a controller 700. The controller 700 stores puncturing positions corresponding to all possible input CQI information bit length information, and provides the zero inserter 701 with control information for the puncturing positions stored based on the input CQI information bit length information. The puncturing positions stored in the controller 700 become information on 12 puncturing positions for each of the (20,2) code, (20,3) code, (20,4) code, and (20,5) code. The puncturing positions managed by the controller 700 are identical to the puncturing positions described in conjunction with the encoder. The zero inserter 701 generates a symbol stream with a length 32 by inserting 0s in the received symbol based on the control information for the puncturing positions from the controller 700. The symbol stream is applied to a correlation calculator (or a correlation-with-Walsh code calculator) 702. The correlation calculator 702 measures a correlation between the symbol stream and each of the Walsh codes W1, W2, W4, W8 and W16 used by the transmitter. For example, the present invention uses an inverse Hadamard transformer for the correlation calculator 702. The inverse Hadamard transformer is a typical device or method for calculating a correlation between an input code and a Walsh code. An output of the correlation calculator 702 is applied to a correlation comparator 703, and the correlation comparator 703 outputs a Walsh code index having the highest correlation as CQI information bits.

Figure 13:
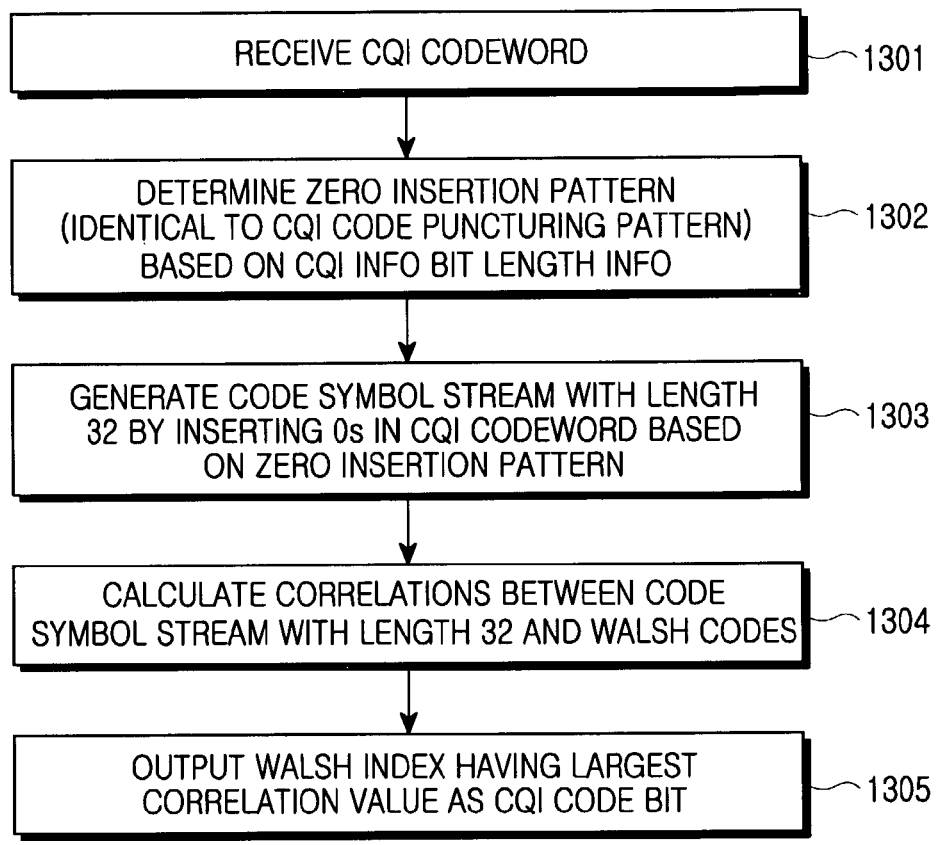
FIG. 13 is a flowchart illustrating an operation of the decoder shown in FIG. 7.

FIG. 13 is a flowchart illustrating a procedure for decoding a CQI codeword described in conjunction with FIG. 7.

Referring to FIG. 13, the decoder receives a CQI codeword with a length 20 in step 1301, and then proceeds to step 1302. In step 1302, the decoder determines a zero insertion pattern (puncturing positions in the transmitter) according to CQI information bit length information. Thereafter, in step 1303, the decoder generates a code symbol stream with a length of 32 bits by inserting 0s in the CQI codeword according to the determined zero insertion pattern. In step 1304, the decoder calculates a correlation between the generated code symbol stream with a length 32 and each of the Walsh codes used in the transmitter. After calculating the correlations with the Walsh codes, the decoder selects in step 1305 the largest correlation value among the calculated correlation values, and outputs a Walsh code index having the largest correlation value. The Walsh code index is CQI information bits.

Figure 8:
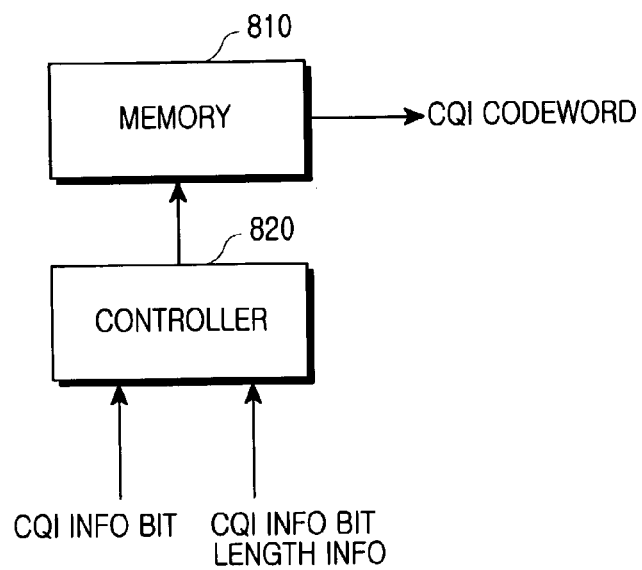
FIG. 8 illustrates a structure of an encoder according to a second embodiment of the present invention.

FIG. 8 illustrates a structure of an encoder for encoding CQI information bits according to a second embodiment of the present invention. The encoder of FIG. 8 is comprised of a memory 810 and a controller 820. The memory 810, a storage device for previously storing all codes according to the types of CQI information bit lengths, outputs a CQI code symbol to be transmitted, under the control of the controller 820. The code symbols stored in the memory 810 are output values of the encoder of FIG. 6, i.e., code symbols with a length 20. The controller 820 receives CQI information bits and CQI information bit length information, and controls the memory 810 to generate a CQI code symbol based on the CQI information bits and the CQI information bit length information. The encoder of FIG. 8 is advantageous in that it has a high coding speed since all CQI codes are previously stored in the memory. However, the encoder needs a storage device for previously storing all the CQI codes. The encoder of FIG. 8 may be realized by a software program having the same function. That is, the memory 810 may become a software memory, and the controller 820 may be realized by a software program having a function of accessing a code symbol depending on two kinds of information received.

Figure 14:
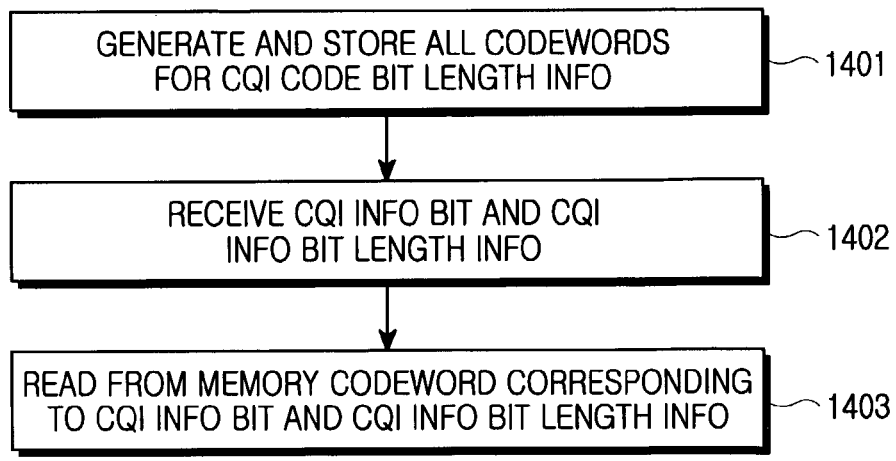
FIG. 14 is a flowchart illustrating an operation of the encoder shown in FIG. 8.

FIG. 14 is a flowchart illustrating an operation of the encoder shown in FIG. 8. Referring to FIG. 14, in step 1401, the encoder generates all codewords based on every kind of CQI information bit length information, and then previously stores the generated codewords. In step 1402, the encoder receives CQI information bits and CQI information bit length information corresponding to the CQI information bits. In step 1403, the encoder controls a memory to generate a codeword based on the received CQI information bits and CQI information bit length information, completing the CQI coding process.

Figure 9:
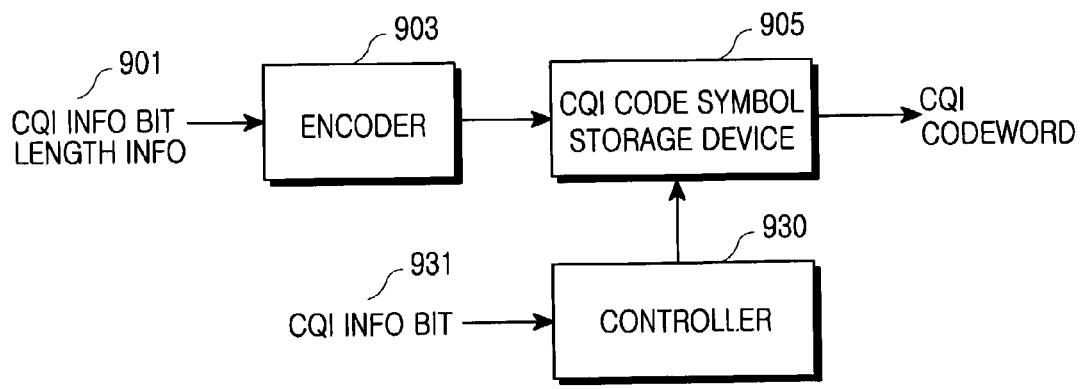
FIG. 9 illustrates a structure of an encoder according to a third embodiment of the present invention.

FIG. 9 illustrates a structure of an encoder for encoding CQI information bits according to a third embodiment of the present invention. The encoder of FIG. 9 is comprised of an encoder 903, a CQI code symbol storage device 905 and a controller 930.

Referring to FIG. 9, the encoder 903 receives CQI information bit length information, and provides the CQI code symbol storage device 905 with all codewords (code symbols) for the CQI information bit length information. The CQI code symbol storage device 905 stores the CQI code symbols provided from the encoder 903. Therefore, the CQI code symbol storage device 905 receives control information for CQI information bits from the controller 930, and outputs a CQI code symbol corresponding to the CQI information bits based on the control information. The encoder of FIG. 9 has the following advantage. That is, in the case where a change in length of the CQI information bits is not so frequent, the encoder generates all CQI code symbols for the CQI information bit length, previously stores the generated CQI code symbols in a storage device, and then accesses a CQI code symbol corresponding to CQI information bits to be transmitted. In addition, since the encoder does not store every kind of CQI code symbols for the CQI information bit length, an area for storing CQI code symbols corresponding to the CQI information bit length is smaller than the storage area of the encoder shown in FIG. 8. Like the memory 810 and the controller 820 of FIG. 8, the CQI code symbol storage device 905 and the controller 930 in the encoder of FIG. 9 can also be realized by software.

Figure 15:
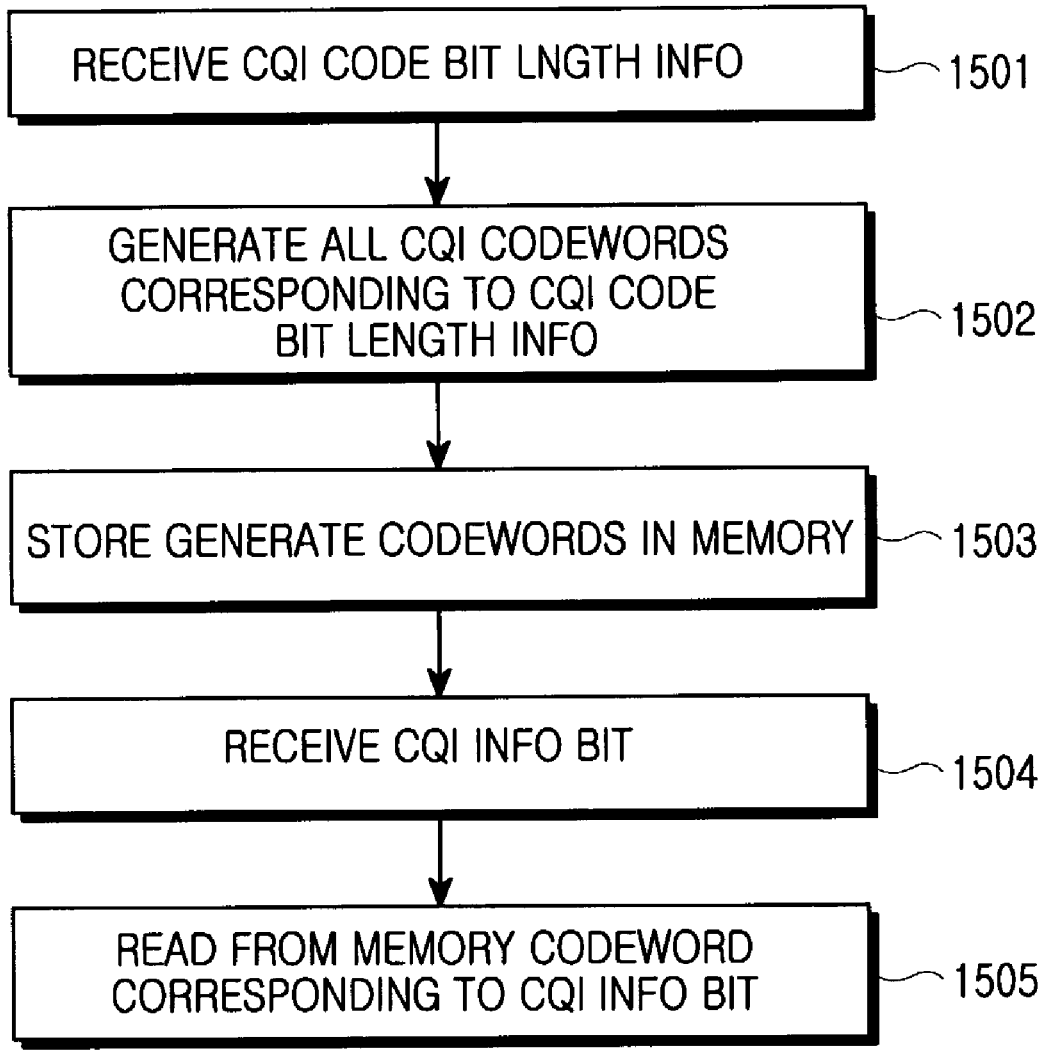
FIG. 15 is a flowchart illustrating an operation of the encoder shown in FIG. 9.

FIG. 15 is a flowchart illustrating an operation of the encoder shown in FIG. 9. Referring to FIG. 15, in step 1501, the encoder receives CQI code bit length information, and then proceeds to step 1502. In step 1502, the encoder generates all CQI code symbols corresponding to the received CQI code bit length information. In step 1503, the encoder stores the generated CQI code symbols in the CQI code symbol storage device 905 of FIG. 9. In step 1504, the encoder receives CQI information bits, and then proceeds to step 1505. In step 1505, encoder reads a codeword corresponding to the received CQI information bits from the CQI code symbol storage device 905, and outputs the read codeword, completing the CQI coding process.

Figure 10:
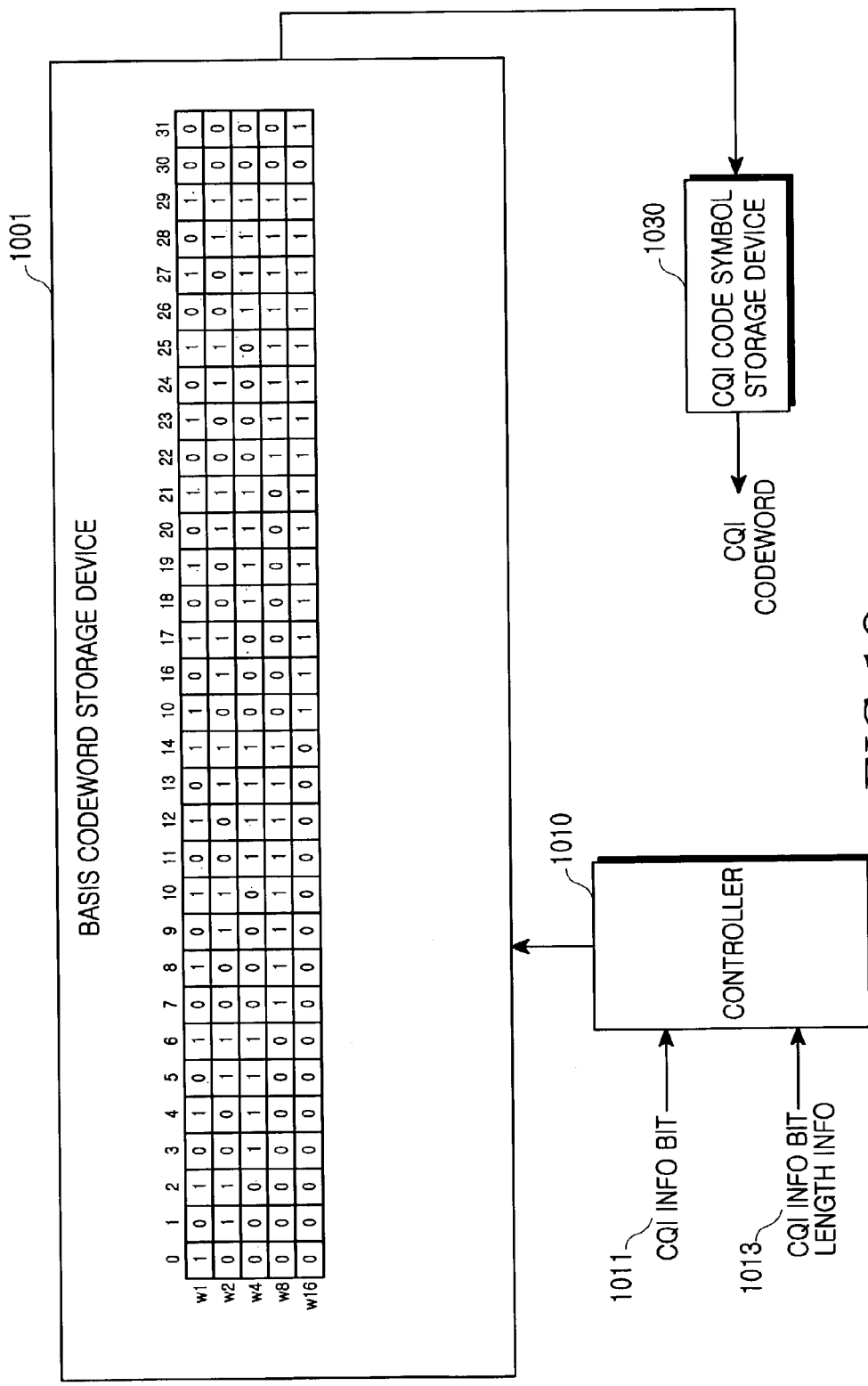
FIG. 10 illustrates a structure of an encoder according to a fourth embodiment of the present invention.

FIG. 10 illustrates a structure of an encoder for encoding CQI information bits according to a fourth embodiment of the present invention. An operation of the encoder shown in FIG. 10 will be described for the case where the decoder receives CQI input bits of '011' and generates the case a (20,3) code.

Referring to FIG. 10, a basis codeword storage device 1001 previously stores basis codewords W1, W2, W4, W8 and W16 described in conjunction with the encoder of FIG. 6. Rows of the basis codeword storage device 1001 represent basis codewords with a length of 32 bits, and columns represent basis code symbols of each basis codeword. A controller 1010 receives CQI information bits 1011 and CQI information bit length information 1013, and based on the received information, controls the basis codeword storage device 1001 to generate a (20,3) code.

The type of the basis codeword used is variable according to the CQI information bit length information 1013, and whether to use the selected basis code is determined according to the value (0 or 1) of the CQI information bits 1011.

In addition, the symbols to be used are chosen among symbols of the selected basis code according to the puncturing pattern illustrated in Table 1. The puncturing pattern may be stored in the controller 1010 or provided from the outside, like the CQI information bits 1011 and the CQI information bit length information 1013.

Since the CQI information bits 1011 are assumed to be '011', the basis codewords W1 and W2 are selected from the basis codeword storage device 1001. Referring to Table 1, the (20,3) codeword has a puncturing pattern of {1,1,1,1,1,1,1,0,1,1,1,1,1,1,1,1,1,1,1,0,0,0,0,0,0,0,0,0,0,0,0}. Therefore, in order to generate a codeword with a length 20 for the CQI information bit '011', the basis codeword storage device 1001 selects $0^{th}$, $1^{st}$, $2^{nd}$, $3^{rd}$, $4^{th}$, $5^{th}$, $6^{th}$, $9^{th}$, $10^{th}$, $11^{th}$, $12^{th}$, $13^{th}$, $14^{th}$, $15^{th}$, $16^{th}$, $17^{th}$, $18^{th}$, $19^{th}$, and $20^{th}$ symbols of each of the codewords W1 and W2, and then adds the selected symbols in the column on a symbol-by-symbol basis. Alternatively, the basis codeword storage device 1001 may add the codewords W1 and W2 symbol by symbol, and then select the $0^{th}$, $1^{st}$, $2^{nd}$, $3^{rd}$, $4^{th}$, $5^{th}$, $6^{th}$, $9^{th}$, $10^{th}$, $11^{th}$, $12^{th}$, $13^{th}$, $14^{th}$, $15^{th}$, $16^{th}$, $17^{th}$, $18^{th}$, $19^{th}$, and $20^{th}$ symbols from the added codeword.

Hitherto, the description has been made of a method for generating a (20,3) code for CQI information bit '011'. However, it would be obvious to those skilled in the art that other codewords can also be generated in the same method. That is, the method may have a process of selecting basis codewords according to input CQI information bit length information, adding the selected basis codewords according to input CQI information bit values, and then selecting code symbols based on the puncturing pattern illustrated in Table 1. A code symbol storage device 1030 of FIG. 10 stores output values of the basis codeword storage device 1001. The code symbol storage device 1030 stores the CQI code symbols, on the assumption that the basis codeword storage device 1001 generates the symbols one by one. In the case where the basis codeword storage device 1001 generates the CQI code symbols at once, the code symbol storage device 1030 is excluded. Like the CQI encoders of FIGS. 8 and 9, the CQI encoder of FIG. 10 can also be realized by software. The basis codeword storage device 1001 can be replaced with a program memory, and the controller 1010 can be replaced with a software program such as an address controller.

Figure 16:
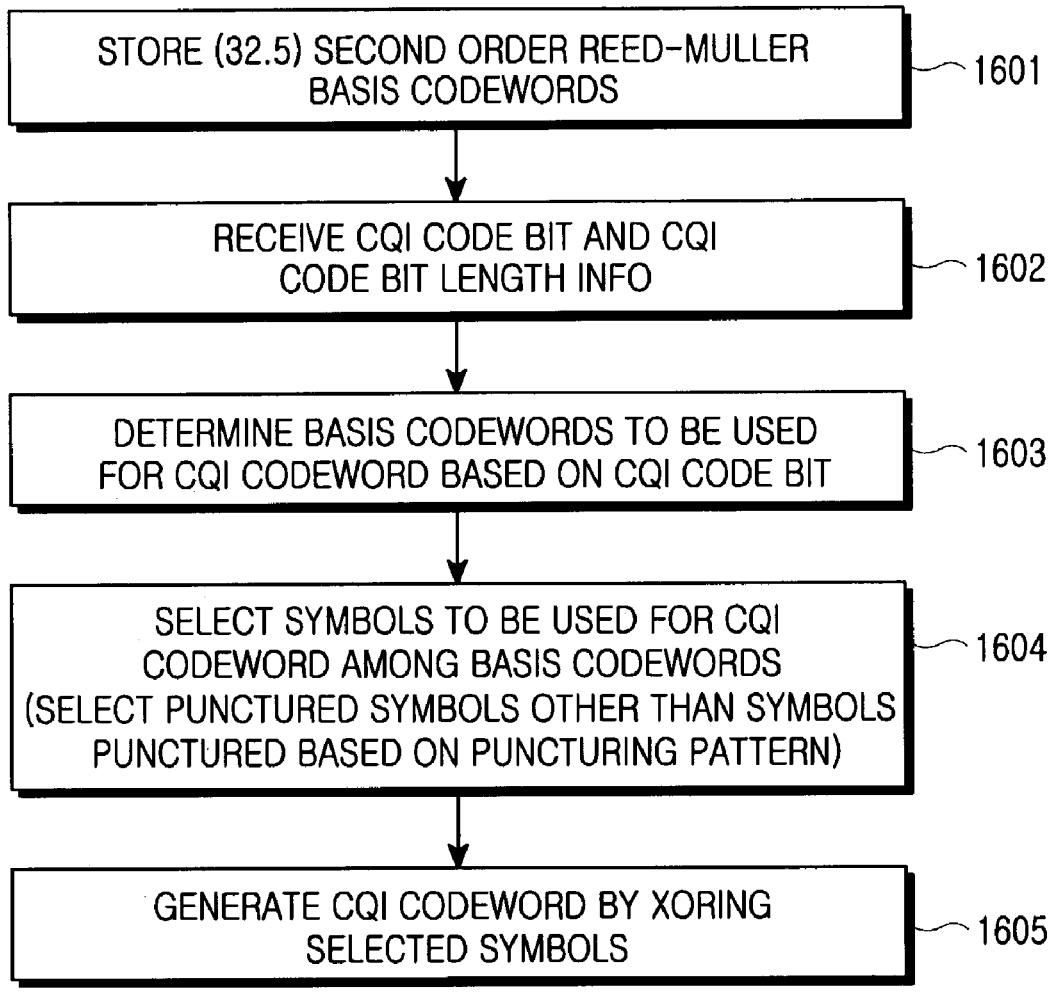
FIG. 16 is a flowchart illustrating an operation of the encoder shown in FIG. 10.

FIG. 16 is a flowchart illustrating an operation of the CQI encoder shown in FIG. 10. Referring to FIG. 16, in step 1601, the encoder stores (32,5) second order Reed-Muller basis codewords in a memory or storage device. In step 1602, the encoder receives CQI code bits, and CQI code bit length information corresponding to the CQI code bits. In step 1603, the encoder selects basis codewords to be used for generating a CQI codeword according to the CQI code bits, among the stored basis codewords. In step 1604, the encoder selects symbols to be used for the CQI codeword among the selected basis codewords. A pattern used to select symbols for the CQI codeword is illustrated in Table 1. That is, the encoder selects symbols in the positions indicated by "1" in Table 1 among the selected basis codewords. In step 1605, the encoder generates a final CQI codeword by XORing the code symbols selected in step 1604 symbol by symbol.

Figure 11:
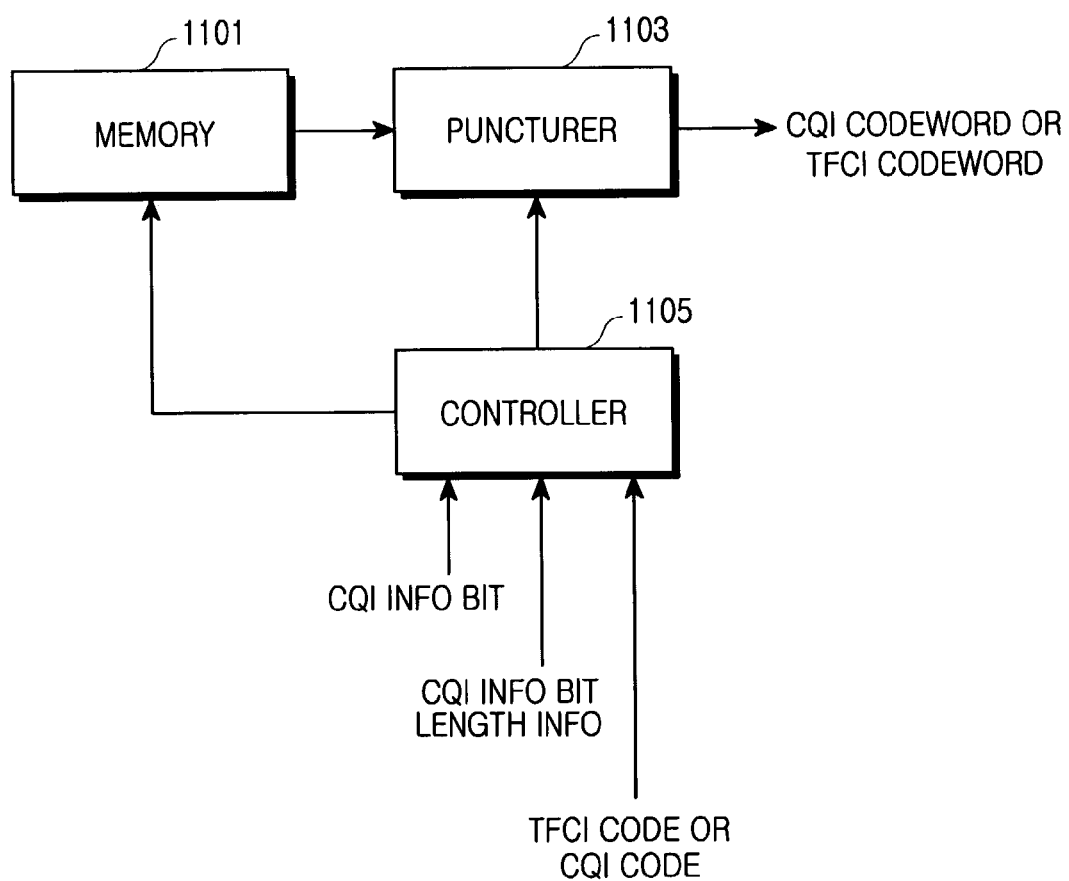
FIG. 11 illustrates a structure of an encoder according to a fifth embodiment of the present invention.

FIG. 11 illustrates a structure of a CQI encoder according to a fifth embodiment of the present invention. Referring to FIG. 11, the CQI encoder is comprised of a memory 1101, a puncturer 1103 and a controller 1105. The memory 1101 previously stores all (32,5) codewords, and provides a particular codeword to the puncturer under the control of the controller 1105. The puncturer 1103 punctures symbols in predetermined positions among a codeword output from the memory 1101, under the control of the controller 1105. For example, when it is desired to generate a TFCI codeword, the puncture 1103 does not perform puncturing on the output symbols of the memory 1101. However, if it is desired to generate a CQI codeword, the memory 1101 outputs a codeword corresponding to CQI information bits and the puncturer 1103 generates CQI code symbols by performing puncturing on the codeword output from the memory 1101 based on a puncturing pattern corresponding to the CQI information bit length information provided to the controller 1105, among the puncturing patterns illustrated in Table 1.

Therefore, the controller 1105 receives CQI information bit length information, CQI information bits, and information indicating whether a code symbol to be generated is a TFCI code symbol or a CQI code symbol, and then controls the memory 1101 and the puncturer 1103 based on the received information.

Figure 17:
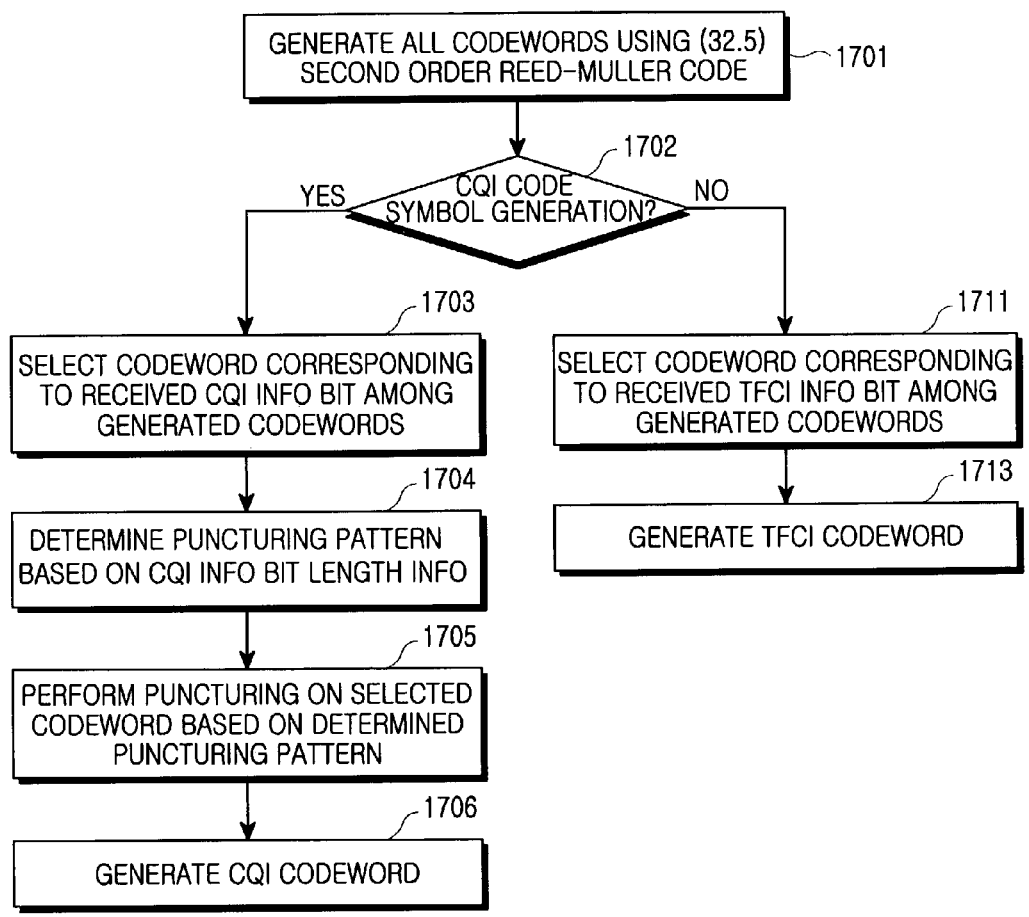
FIG. 17 is a flowchart illustrating an operation of the encoder shown in FIG. 11.

FIG. 17 is a flowchart illustrating an operation of a CQI encoder shown in FIG. 11. Referring to FIG. 17, in step 1701, the encoder generates all codewords using a (32,5) second order Reed-Muller code and stores the generated codewords. In step 1702, the encoder determines whether it will generate a CQI codeword or a TFCI codeword. If it is determined to generate a CQI codeword in step 1702, the encoder proceeds to step 1703. Otherwise, if it is determined to generate a TFCI codeword in step 1702, the encoder proceeds to step 1711. In step 1703, the encoder selects a codeword corresponding to CQI information bits received among the generated codewords. In step 1704, the encoder determines a puncturing pattern to be used for generating a CQI codeword corresponding to CQI information bit length information received. The encoder performs puncturing on the selected codeword according to the determined puncturing pattern in step 1705, and generates a CQI codeword in step 1706. However, in step 1711, the encoder selects one basis codeword corresponding to TFCI information bits received among the generated (32,5) second order Reed-Muller codes, and then generates a TFCI codeword in step 1713.

Although the present invention has been described with reference to HSDPA, a high-speed downlink packet communication technique, in a 3GPP mobile communication system, the prevention invention can be applied even to other communication systems which encode a physical control channel signal or other signals before transmission.

As described above, the novel coding apparatus and method for a mobile communication system supporting HSDPA encodes 2 to 5 information bits into a code symbol with a length 20 having optimal coding performance. In particular, the proposed coding apparatus and method can generate a code symbol having optimal coding performance based on the CQI information length when encoding CQI information transmitted over an uplink control channel.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A coding method in a mobile communication system, for receiving 5 information bits and generating a coded symbol stream comprised of 20 coded symbols, the coding method comprising the steps of:
generating 5 coded symbol streams having a length 32 by encoding each of the 5 information bits with a different Walsh code each having a length 32, and generating a coded symbol stream comprised of 32 coded symbols by XORing the 5 coded symbol streams in a symbol unit; and
generating a coded symbol stream comprised of 20 coded symbols by puncturing $2^{nd}$, $4^{th}$, $5^{th}$, $6^{th}$, $8^{th}$, $9^{th}$, $10^{th}$, $11^{th}$, $12^{th}$, $13^{th}$, $14^{th}$, and $30^{th}$ coded symbols among the 32 coded symbols.

2. The coding method of claim 1, wherein the information bits include information indicating a condition of a downlink channel supporting high-speed downlink packet access (HSDPA).

3. The coding method of claim 1, wherein the information bits include information indicating a modulation technique and a data rate, mapped according to a condition of a downlink channel supporting HSDPA.

4. The coding method of claim 1, wherein the code symbol stream comprised of 20 coded symbols is transmitted over a secondary uplink dedicated physical control channel (S-UL_DPCCH) along with a 10-bit response signal responsive to packet data received over the downlink channel.

5. The coding method of claim 4, wherein the downlink channel is a downlink dedicated physical channel.

6. A coding apparatus in a mobile communication system, for receiving 5 input information bits, generating 5 coded symbol streams having a length 32 by encoding each of the 5 input information bits with a different Walsh code each having a length 32, and generating a coded symbol stream comprised of 32 coded symbols by XORing the 5 coded symbol streams in a symbol unit, thereby to generate a code symbol stream comprised of 20 coded symbols, the coding apparatus comprising:
a puncturer for generating a code symbol stream comprised of 20 coded symbols by puncturing $2^{nd}$, $4^{th}$, $5^{th}$, $6^{th}$, $8^{th}$, $9^{th}$, $10^{th}$, $11^{th}$, $12^{th}$, $13^{th}$, $14^{th}$, and $30^{th}$ coded symbols among the 32 coded symbols.

7. The coding apparatus of claim 6, wherein the information bits include information indicating a condition of a downlink channel supporting high-speed downlink packet access (HSDPA).

8. The coding apparatus of claim 6, wherein the information bits include information indicating a modulation technique and a data rate, mapped according to a condition of a downlink channel supporting HSDPA.

9. The coding apparatus of claim 6, wherein the coded symbol stream comprised of 20 coded symbols is transmitted over a secondary uplink dedicated physical control channel (S-UL_DPCCH) along with a 10-bit response signal responsive to packet data received over the downlink channel.

10. The coding apparatus of claim 9, wherein the downlink channel is a downlink dedicated physical channel.

11. A decoding method in a mobile communication system, for receiving a code symbol stream comprised of 20 coded symbols and generating 5 information bits from the coded symbol stream, the decoding method comprising the steps of:
generating a code symbol stream comprised of 32 coded symbols by inserting 0s into positions of $2^{nd}$, $4^{th}$, $5^{th}$, $6^{th}$, $8^{th}$, $9^{th}$, $10^{th}$, $11^{th}$, $12^{th}$, $13^{th}$, $14^{th}$, and $30^{th}$ coded symbols of the coded symbol stream;
measuring correlation values between each of Walsh codes W1, W2, W4, W8 and W16 having a length 32, and the 0-inserted coded symbol stream; and
generating the information bits from the measured correlation values.

12. The decoding method of claim 11, wherein the information bits include information indicating a condition of a downlink channel supporting high-speed downlink packet access (HSDPA).

13. The decoding method of claim 11, wherein the information bits include information indicating a modulation technique and a data rate, mapped according to a condition of a downlink channel supporting HSDPA.

14. The decoding method of claim 11, wherein the coded symbol stream comprised of 20 coded symbols is transmitted over a secondary uplink dedicated physical control channel (S-UL_DPCCH) along with a 10-bit response signal responsive to packet data received over the downlink channel.

15. The decoding method of claim 14, wherein the downlink channel is a downlink dedicated physical channel.

16. A decoding apparatus in a mobile communication system, for receiving a coded symbol stream comprised of 20 coded symbols and generating 5 information bits from the coded symbol stream, the decoding apparatus comprising:

a zero (0) inserter for generating a coded symbol stream comprised of 32 coded symbols by inserting 0s into positions of $2^{nd}$, $4^{th}$, $5^{th}$, $6^{th}$, $8^{th}$, $9^{th}$, $10^{th}$, $11^{th}$, $12^{th}$, $13^{th}$, $14^{th}$, and $30^{th}$ coded symbols of the coded symbol stream;

a correlation calculator for measuring correlation values between individual Walsh codes W1, W2, W4, W8 and W16 having a length 32, and the 0-inserted coded symbol stream; and a correlation comparator for generating the information bits from the measured correlation values.

17. The decoding apparatus of claim 16, wherein the information bits include information indicating a condition of a downlink channel supporting high-speed downlink packet access (HSDPA).

18. The decoding apparatus of claim 16, wherein the information bits include information indicating a modulation technique and a data rate, mapped according to a condition of a downlink channel supporting HSDPA.

19. The decoding apparatus of claim 16, wherein the code symbol stream comprised of 20 coded symbols is transmitted over a secondary uplink dedicated physical control channel (S-UL DPCCH) along with a 10-bit response signal responsive to packet data received over the downlink channel.

20. The decoding apparatus of claim 19, wherein the downlink channel is a downlink dedicated physical channel.

21. A coding method in a mobile communication system, for receiving 5 information bits indicating a quality of a downlink channel supporting high-speed downlink packet access (HSDPA) and generating a coded symbol stream comprised of 20 coded symbols, the coding method comprising the steps of:

generating 5 code symbol streams having a length 32 by encoding each of the 5 information bits with a different Walsh code W1, W2, W4, W8 and W16, and generating a coded symbol stream comprised of 32 coded symbols by XORing the 5 coded symbol streams in a symbol unit; and generating a code symbol stream comprised of 20 coded symbols by puncturing $2^{nd}$, $4^{th}$, $5^{th}$, $6^{th}$, $8^{th}$, $9^{th}$, $10^{th}$, $11^{th}$, $12^{th}$, $13^{th}$, $14^{th}$, and $30^{th}$ coded symbols among the 32 coded symbols.

22. A decoding method in a mobile communication system, for receiving a coded symbol stream comprised of 20 coded symbols and generating 5 information bits indicating a quality of a downlink channel supporting high-speed downlink packet access (HSDPA) from the coded symbol stream, the decoding method comprising the steps of:

generating a code symbol stream comprised of 32 coded symbols by inserting 0s into positions of $2^{nd}$, $4^{th}$, $5^{th}$, $6^{th}$, $8^{th}$, $9^{th}$, $10^{th}$, $11^{th}$, $12^{th}$, $13^{th}$, $14^{th}$, and $30^{th}$ coded symbols of the code symbol stream;

measuring correlation values between individual Walsh codes W1, W2, W4, W8 and W16 having a length 32, and the 0-inserted coded symbol stream; and generating the information bits from the measured correlation values.

* * * * *